(12) United States Patent  (10) Patent No.: US 9,131,220 B2
Givon  (45) Date of Patent: Sep. 8, 2015

(54) APPARATUS METHOD AND SYSTEM FOR IMAGING

(71) Applicant: EXTREME REALITY LTD., Herzeliya Pituah (IL)

(72) Inventor: Dor Givon, Tel Aviv (IL)

(73) Assignee: EXTREME REALITY LTD., Herzliya (IL)

(*) Notice: Subject to any disclaimer, the term of this patent is extended or adjusted under 35 U.S.C. 154(b) by 64 days.

(21) Appl. No.: 13/734,987

(22) Filed: Jan. 6, 2013

(65) Prior Publication Data

US 2013/0188024 A1  Jul. 25, 2013

Related U.S. Application Data

(63) Continuation of application No. 12/092,220, filed as application No. PCT/IL2006/001254 on Oct. 31, 2006, now Pat. No. 8,462,199, which is a continuation of application No. 11/277,578, filed on Mar. 27, 2006, now abandoned.

(60) Provisional application No. 60/731,274, filed on Oct. 31, 2005.

(51) Int. Cl.
*H04N 13/00* (2006.01)
*H04N 15/00* (2006.01)
(Continued)

(52) U.S. Cl.
CPC .......... *H04N 13/0203* (2013.01); *G03H 1/268* (2013.01); *H04N 13/0217* (2013.01); *H04N 13/0257* (2013.01); *G03H 2210/42* (2013.01); *G03H 2210/441* (2013.01)

(58) Field of Classification Search
CPC ... H04N 13/021; H04N 5/225; H04N 3/0239; H04N 13/0203; H04N 13/0217; H04N 13/0257; G02B 13/16; G03H 1/268; G03H 2210/42; G03H 2210/441; G06F 3/0425
USPC ....................................... 348/49, 42
See application file for complete search history.

(56) References Cited

U.S. PATENT DOCUMENTS 4,376,950 A   3/1983  Brown et al.
5,049,987 A * 9/1991  Hoppenstein ................ 348/48
(Continued)

FOREIGN PATENT DOCUMENTS

EP   1 115254    7/2001
JP   10-040418   2/1998
(Continued)

OTHER PUBLICATIONS

Carranza et al., "Free-Viewpoint Video of 1-39 Human Actors", Proc. of ACM Siggraph 2003, Jul. 27, 2003.
(Continued)

*Primary Examiner* — Jessica M Prince
(74) *Attorney, Agent, or Firm* — Vladimir Sherman; Professional Patent Solutions

(57) ABSTRACT

There is provided in accordance with some embodiments of the present invention an optical assembly including a set of optical paths, wherein two or more optical paths receive an image from a common surface. The optical paths may direct received images onto a common image sensor generating a complex multidimensional data set, an image processing block may extrapolate each of the subset of optical paths printed on the image sensor and may generate a multidimensional data set based on the collected images.

9 Claims, 17 Drawing Sheets

Spatial Neighborhood
Vs(x1)

search epipolar line
Vs(x2)

Temporal Neighborhood
Vt(x1,t0)

search epipolar line
Vt(x2,t0)

(51) Int. Cl.
*H04N 13/02* (2006.01)
*G03H 1/26* (2006.01)

(56) References Cited

U.S. PATENT DOCUMENTS

| | | |
|---|---|---|
| 5,130,794 A | 7/1992 | Ritchey |
| 5,515,183 A | 5/1996 | Hashimoto |
| 5,691,885 A | 11/1997 | Ward et al. |
| 5,703,704 A | 12/1997 | Nakagawa et al. |
| 5,745,719 A | 4/1998 | Falcon |
| 5,831,633 A | 11/1998 | Van Roy |
| 5,835,133 A | 11/1998 | Moreton et al. |
| 5,852,450 A | 12/1998 | Thingvold |
| 5,909,218 A | 6/1999 | Naka et al. |
| 6,115,482 A | 9/2000 | Sears et al. |
| 6,243,106 B1 | 6/2001 | Rehg et al. |
| 6,303,924 B1 | 10/2001 | Adan et al. |
| 6,317,130 B1 | 11/2001 | Ishikawa et al. |
| 6,388,670 B2 | 5/2002 | Naka et al. |
| 6,529,643 B1 | 3/2003 | Loce et al. |
| 6,545,663 B1 | 4/2003 | Arbter et al. |
| 6,554,706 B2 | 4/2003 | Kim et al. |
| 6,597,801 B1 | 7/2003 | Cham et al. |
| 6,657,670 B1 | 12/2003 | Cheng |
| 6,674,877 B1 | 1/2004 | Jojic et al. |
| 6,681,031 B2 | 1/2004 | Cohen et al. |
| 6,833,843 B2 | 12/2004 | Mojaver et al. |
| 6,906,687 B2 | 6/2005 | Werner |
| 7,061,492 B2 | 6/2006 | Carrai et al. |
| 7,061,532 B2* | 6/2006 | Silverstein .................... 348/335 |
| 7,116,330 B2 | 10/2006 | Marshall et al. |
| 7,123,292 B1 | 10/2006 | Seeger et al. |
| 7,184,589 B2 | 2/2007 | Okubo |
| 7,257,237 B1 | 8/2007 | Luck et al. |
| 7,308,112 B2 | 12/2007 | Fujimura et al. |
| 7,366,278 B2 | 4/2008 | Fu et al. |
| 7,379,105 B1* | 5/2008 | Frank et al. .................... 348/242 |
| 7,429,997 B2 | 9/2008 | Givon |
| 7,710,475 B2* | 5/2010 | Matsumoto .................... 348/273 |
| 7,755,608 B2 | 7/2010 | Chang et al. |
| 7,783,118 B2 | 8/2010 | Zhou |
| 7,885,480 B2 | 2/2011 | Bryll et al. |
| 7,903,141 B1 | 3/2011 | Mariano et al. |
| 7,936,932 B2 | 5/2011 | Bashyam et al. |
| 7,978,917 B2 | 7/2011 | Lei et al. |
| 8,005,263 B2 | 8/2011 | Fujimura et al. |
| 8,036,494 B2 | 10/2011 | Chen |
| 8,094,873 B2 | 1/2012 | Kelusky et al. |
| 8,094,943 B2 | 1/2012 | Eaton et al. |
| 8,107,726 B2 | 1/2012 | Xu et al. |
| 8,111,284 B1 | 2/2012 | Givon |
| 8,114,172 B2 | 2/2012 | Givon |
| 8,237,775 B2 | 8/2012 | Givon |
| 8,432,390 B2 | 4/2013 | Givon |
| 8,462,199 B2 | 6/2013 | Givon |
| 2001/0007452 A1 | 7/2001 | Naka et al. |
| 2002/0191239 A1 | 12/2002 | Psaltis et al. |
| 2003/0007680 A1* | 1/2003 | Iijima et al. .................... 382/154 |
| 2004/0155962 A1 | 8/2004 | Marks |
| 2004/0161133 A1 | 8/2004 | Elazar et al. |
| 2004/0193413 A1 | 9/2004 | Wilson et al. |
| 2004/0228530 A1 | 11/2004 | Schwartz |
| 2005/0023448 A1 | 2/2005 | Ogawara et al. |
| 2005/0041842 A1 | 2/2005 | Frakes et al. |
| 2005/0063596 A1 | 3/2005 | Yomdin et al. |
| 2005/0166163 A1 | 7/2005 | Chang et al. |
| 2005/0232514 A1 | 10/2005 | Chen |
| 2005/0259870 A1 | 11/2005 | Kondo et al. |
| 2005/0271279 A1 | 12/2005 | Fujimura et al. |
| 2006/0010400 A1 | 1/2006 | Dehlin et al. |
| 2006/0056679 A1 | 3/2006 | Redert et al. |
| 2006/0104480 A1 | 5/2006 | Fleisher |
| 2006/0164230 A1 | 7/2006 | DeWind et al. |
| 2006/0187305 A1 | 8/2006 | Trivedi et al. |
| 2006/0294509 A1 | 12/2006 | Mital et al. |
| 2007/0098250 A1 | 5/2007 | Molgaard et al. |
| 2007/0183633 A1 | 8/2007 | Hoffmann |
| 2007/0183663 A1 | 8/2007 | Wang et al. |
| 2007/0236475 A1 | 10/2007 | Wherry |
| 2007/0259717 A1 | 11/2007 | Mattice et al. |
| 2007/0285419 A1 | 12/2007 | Givon |
| 2007/0285554 A1 | 12/2007 | Givon |
| 2008/0007533 A1 | 1/2008 | Hotelling |
| 2008/0013793 A1 | 1/2008 | Hillis et al. |
| 2008/0030460 A1 | 2/2008 | Hildreth et al. |
| 2008/0036732 A1 | 2/2008 | Wilson et al. |
| 2008/0037829 A1 | 2/2008 | Givon |
| 2008/0037869 A1 | 2/2008 | Zhou |
| 2008/0101722 A1 | 5/2008 | Bryll et al. |
| 2008/0104547 A1 | 5/2008 | Morita et al. |
| 2008/0111710 A1 | 5/2008 | Boillot |
| 2008/0143975 A1 | 6/2008 | Dennard et al. |
| 2008/0148149 A1 | 6/2008 | Singh et al. |
| 2008/0181499 A1 | 7/2008 | Yang et al. |
| 2009/0058833 A1 | 3/2009 | Newton |
| 2009/0062696 A1 | 3/2009 | Nathan et al. |
| 2009/0080715 A1 | 3/2009 | Van Beek et al. |
| 2009/0116732 A1 | 5/2009 | Zhou et al. |
| 2009/0141987 A1 | 6/2009 | McGarry et al. |
| 2010/0066735 A1 | 3/2010 | Givon |
| 2010/0111370 A1 | 5/2010 | Black et al. |
| 2010/0141802 A1 | 6/2010 | Knight et al. |
| 2010/0194862 A1 | 8/2010 | Givon |
| 2010/0208038 A1 | 8/2010 | Kutliroff et al. |
| 2010/0303290 A1 | 12/2010 | Mathe |
| 2010/0328351 A1 | 12/2010 | Tan |
| 2011/0052068 A1 | 3/2011 | Cobb et al. |
| 2011/0069152 A1 | 3/2011 | Wang et al. |
| 2011/0080496 A1 | 4/2011 | Givon |
| 2011/0129124 A1 | 6/2011 | Givon |
| 2011/0163948 A1 | 7/2011 | Givon et al. |
| 2011/0286673 A1 | 11/2011 | Givon et al. |
| 2011/0292036 A1 | 12/2011 | Sali et al. |
| 2012/0176414 A1 | 7/2012 | Givon |
| 2012/0176477 A1 | 7/2012 | Givon |
| 2012/0218183 A1 | 8/2012 | Givon et al. |
| 2013/0120319 A1 | 5/2013 | Givon |

FOREIGN PATENT DOCUMENTS

| | | |
|---|---|---|
| JP | 2001-246161 | 9/2001 |
| JP | 2002-216146 | 8/2002 |
| JP | 2004-062692 | 2/2004 |
| JP | 2006-040271 | 2/2006 |
| JP | 2007-531113 | 1/2007 |
| JP | 2007-302223 | 11/2007 |
| WO | WO 03/025859 | 3/2003 |
| WO | WO 03/039698 | 5/2003 |
| WO | WO 2004/013814 | 2/2004 |
| WO | WO 2004/094943 | 11/2004 |
| WO | WO 2005/114556 | 12/2005 |
| WO | WO 2006/011153 | 2/2006 |
| WO | WO 2006/099597 | 9/2006 |
| WO | WO 2008/126069 | 10/2008 |
| WO | WO 2011/033519 | 3/2011 |
| WO | WO 2013/069023 | 5/2013 |

OTHER PUBLICATIONS

Cheung G K M et al.,"Shape-from-silhouette of articulated objects and its use for human body kinematics estimation and motion capture", Proceedings / 2003 IEEE Computer Society Conference on Computer Vision and Pattern Recognition, Jun. 18-20, 2003, Madison, Wisconsin.

Starck et al., "Model-based multiple view reconstruction of people", Proceedings of the Eight IEEE International Conference on Computer Vision. (ICCV). Nice, France, Oct. 13-16, 2003.

Molet T et al: "An animation interface designed for motion capture", Computer Animation '97 Geneva, Switzerland Jun. 5-6, 1997.

Kronrod B et al., "Optimized triangle mesh compression using prediction trees", Computer Graphics and Applications, 2000. Proceedings. the Eighth Pacific Conference on Hong Kong, China Oct. 3-5, 2000.

(56) References Cited

OTHER PUBLICATIONS

Theobalt C et al.,: "Enhancing silhouette-based human motion capture with 3D motion fields", Computer Graphics and Applications, 2003. Proceedings. 11th Pacific Conference on Oct. 8-10, 2003, Piscataway, NJ, USA, IEEE, Oct. 8, 2003.

Bregler C et al: "Tracking people with twists and exponential maps", Computer Vision and Pattern Recognition, 1998. Proceedings. 1998 IEEE Computer Society Conference on Santa Barbara, CA, USA Jun. 23-25, 1998, Los Alamitos, CA,USA,IEEE Comput. Soc, US, Jun. 23, 1998, pp. 8-15, XP010291718.

Sminchisescu et al. "Estimated Articulated Human Motion with Covariance Scaled Sampling". Published 2003.

Sappa et al. "Monocular 3D Human Body Reconstruction toward Depth Augmentation of Television Sequences". Published 2003.

Sminchisescu et al. "Human Pose Estimation from Silhouettes A Consistent Approach Using Distance Level Set". Published 2002.

Sminchisescu C et al: "Kinematic jump processes for monocular 3D human tracking", Proceedings / 2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition], Los Alamitos, Calif. [U.A, vol. 1, Jun. 18, 2003, pp. 69-76, XP010644883, DOI: 10.1109/CVPR.2003.1211339 ISBN: 978-0-7695-1900-5.

Ren NG, "Digital Light Field Photography", Jul. 2006, (available at www.lytro.com/rennig-thesis.pdf).

D'Apuzzo N et al: "Modeling human bodies from video sequences", SPIE Proceedings, The International Society for Optical Engineering—SPIE, Bellingham, Washington, USA, vol. 3641, Jan. 1, 1998, pp. 36-47, XP002597223, ISSN: 0277-786X, DOI: 10.1117/12.333796.

\* cited by examiner

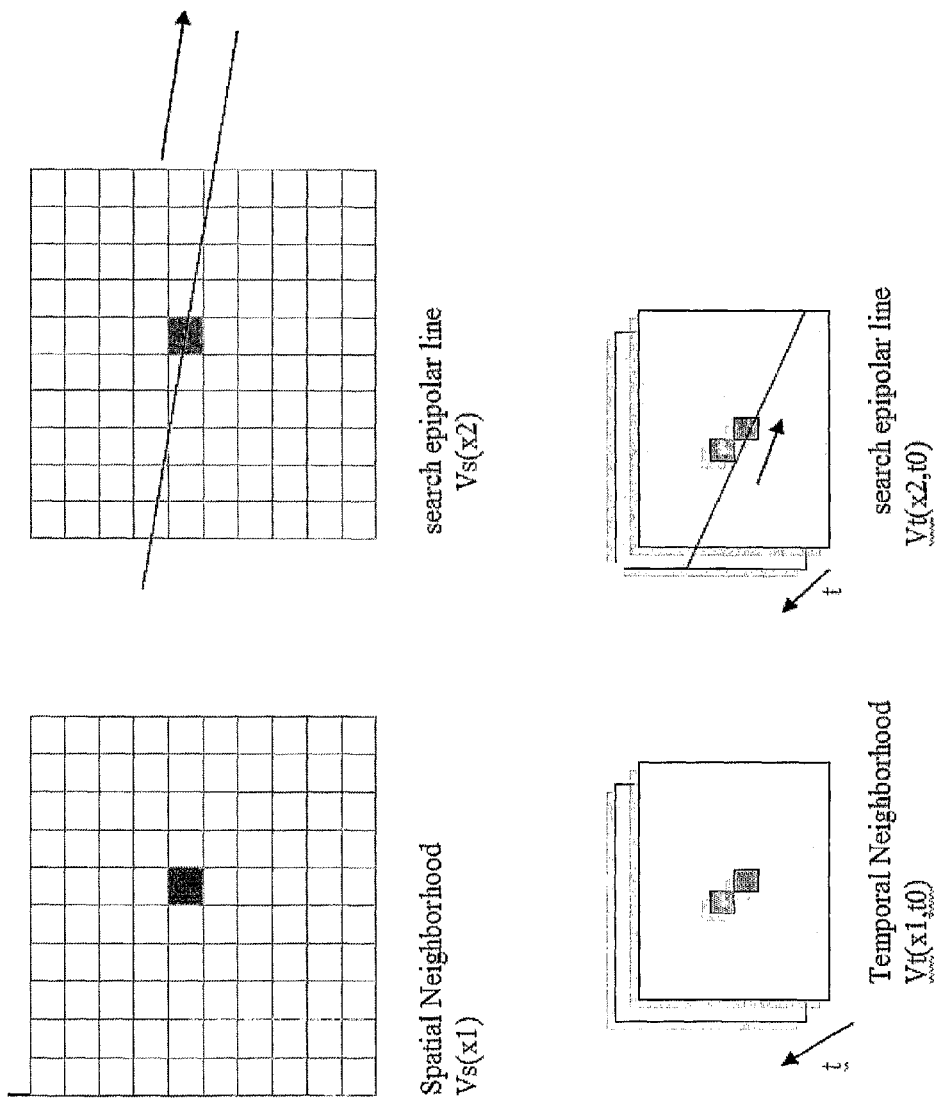

Hologram
Still & Video

⇩

Using known in art methods
for transforming 4D matrix
to a optical /digital hologram.

Depth map

Stereo Images 2D images
from virtual
multiple View
points

APPARATUS METHOD AND SYSTEM FOR IMAGING

FIELD OF THE INVENTION

The present invention relates generally to the field of imaging. More specifically, the present invention relates to an apparatus, method and system having multiple optical paths for acquiring one or more images from a scene and producing one or more data sets representative of various aspects of the scene, including depth (i.e. Three Dimensional—3D) information.

BACKGROUND

Conventional 3D-stereoscopic photography typically employs twin cameras having parallel optical axes and a fixed distance between their aligned lenses. These twin cameras generally produce a pair of images which images can be displayed by any of the known in the art techniques for stereoscopic displaying and viewing. These techniques are based, in general, on the principle that the image taken by a right lens is displayed to the right eye of a viewer and the image taken by the left lens is displayed to the left eye of the viewer.

For example, U.S. Pat. No. 6,906,687, assigned to Texas Instruments Incorporated, entitled "Digital formatter for 3-dimensional display applications" discloses a 3D digital projection display that uses a quadruple memory buffer to store and read processed video data for both right-eye and left-eye display. With this formatter video data is processed at a 48-frame/sec rate and readout twice (repeated) to provide a flash rate of 96 (up to 120) frames/sec, which is above the display flicker threshold. The data is then synchronized with a headset or goggles with the right-eye and left-eye frames being precisely out-of-phase to produce a perceived 3-D image.

Spherical or panoramic photographing is traditionally done either by a very wide-angle lens, such as a "fish-eye" lens, or by "stitching" together overlapping adjacent images to cover a wide field of vision, up to fully spherical fields of vision. The panoramic or spherical images obtained by using such techniques can be two dimensional images or stereoscopic images, giving to the viewer a perception of depth. These images can also be computed as three dimensional (3D-depth) images in terms of computing the distance of every pixel in the image from the camera using known in art passive methods such as triangulation methods, semi active methods or active methods.

For example, U.S. Pat. No. 6,833,843, assigned to Tempest Microsystems Incorporated, teaches an image acquisition and viewing system that employs a fish-eye lens and an imager such as, a charge coupled device (CCD), to obtain a wide angle image, e.g., an image of a hemispherical field of view.

Reference is also made to applicant's co-pending U.S. patent application Ser. No. 10/416,533, filed Nov. 28, 2001, the contents of which are hereby incorporated by reference. The application teaches an imaging system for obtaining full stereoscopic spherical images of the visual environment surrounding a viewer, 360 degrees both horizontally and vertically. Displaying the images by means suitable for stereoscopic displaying, gives the viewers the ability to look everywhere around them, as well as up and down, while having stereoscopic depth perception of the displayed images. The disclosure teaches an array of cameras, wherein the lenses of the cameras are situated on a curved surface, pointing out from C common centers of said curved surface. The captured images are arranged and processed to create a pair of stereoscopic image pairs, wherein one image of said pair is designated for the observer's right eye and the second image for his left eye, thus creating a three dimensional perception.

3D Depth Images Using Active Methods

Active methods may intentionally project high-frequency illumination into the scene in order to construct 3D measurement of the image. For example, 3DV systems Incorporated (http://www.3dvsystems.com/) provides the ZCam™ camera which captures, in real time, the depth value of each pixel in the scene in addition to the color value, thus creating a depth map for every frame of the scene by grey level scaling of the distances. The Zcam™ camera is a uniquely designed camera which employs a light wall having a proper width. The light wall may be generated, for example, as a square laser pulse. As the light wall hits objects in a photographed scene it is reflected towards the ZCam™ camera carrying an imprint of the objects. The imprint carries all the information required for the reconstruction of the depth maps.

3D Depth Images Using Passive Methods

Using passive methods, for example stereo algorithms may attempt to find matching image features between a pair of images about which nothing is known a priori. Passive methods for depth construction may use triangulation techniques that make use of at least two known scene viewpoints. Corresponding features are identified, and rays are intersected to find the 3D position of each feature.

Corresponding features may be identified over space and time, as exemplified in FIG. 1, the basic principle of space-time stereo is that traditional stereo matches vectors in the spatial or image domain to determine correspondence between pixels in a single pair of images for a static moment in time.

In temporal stereo, using multiple frames across time, we match a single pixel from the first image against the second image. Rather than increasing a vector by considering a neighborhood in the spatial direction, it is possible to increase a vector in the temporal direction.

Space-time stereo adds a temporal dimension to the neighborhoods used in the spatial matching function. Adding temporal stereo, using multiple frames across time, we match a single pixel from the first image against the second image. This can also be done by matching space-time trajectories of moving objects, in contrast to matching interest points (corners), as done in regular feature-based image-to-image matching techniques. The sequences are matched in space and time by enforcing consistent matching of all points along corresponding space-time trajectories, also obtaining sub-frame temporal correspondence (synchronization) between two video sequences. For example "Tidex" (www.tidexsystems.com/products.htm) extracts 3D depth information from a 2D video sequence of a rigid structure and modeling it as a rigid 3D model. Another example is the "SOS technology" (www.hoip.jp/ENG/sosENG.htm, www.viewplus.co.jp/products/sos/astro-e.html) Stereo Omni-directional System (SOS), that simultaneously acquires images and 3D information on every direction using 20 sets of 3 cameras each, 60 cameras in total as shown in FIG. 2, applying for various fields, such as scene sensing and robot vision.

Semi Active Methods

Semi active methods intentionally project high-frequency illumination into the scene to aid in determining good correspondences, significantly improving performance in areas of little texture in order to construct 3D measurement of the image. Constructing easily identifiable features in order to minimize the difficulty involved in determining correspondence, illumination such as laser scanning and structured light, carrying various colors, patterns or a certain threshold over time. The illumination means can comprise one or more laser sources, such as a small diode laser, or other small radiation sources for generating beams of visible or invisible light in a set of points in the area of the lenses to form a set of imprinted markers in the captured images. Said set of imprinted markers are identified and enable passive methods to facilitate image processing in accordance with known in art passive processing methods. For example structured light scanning where a known set of temporal patterns (the structured light patterns) are used for matching. These patterns induce a temporal matching vector. Structured light is a special case of space-time stereo, with matching in the temporal domain. Another example would be laser scanning, where a single camera and a laser scanner sweeps across a scene. A plane of laser light is generated from a single point of projection and is moved across the scene. At any given time, the camera can see the intersection of this plane with the object. Both spatial and temporal domain laser scanners have been built for that purpose.

Holographic-Stereogram

Production of holographic stereogram from two-dimensional photographs is an established technique, first described by De Bietetto (1969). Unlike traditional holograms, holographic stereograms consist of information recorded from a number of discrete viewpoints. Laser-illuminated display holography, developed in 1964 by Leith and Upatnieks, was the first truly high quality three-dimensional display medium. Hologram is burdened by the fact that it is not only a display but also a recording medium. Holographic recording must be done in monochromatic, coherent light, and requires that the objects being imaged remain stable to within a fraction of a wavelength of light. These requirements have hindered holography from gaining widespread use. In addition, the amount of optical information stored in a hologram makes the computation of holographic patterns very difficult.

A holographic stereogram records a relatively large number of viewpoints of an object and may use a hologram to record those viewpoints and present them to a viewer. The information content of the stereogram is greatly reduced from that of a true hologram because only a finite number of different views of the scene are stored. The number of views captured can be chosen based on human perception rather than on the storage capacity of the medium. The capturing of the viewpoints for the stereogram is detached from the recording process; image capture is photographic and optically incoherent, so that images of natural scenes with natural lighting can be displayed in a stereogram. The input views for traditional stereograms are taken with ordinary photographic cameras and can be synthesized using computer graphic techniques. Using recently developed true color holographic techniques, extremely high quality, accurate, and natural-looking display holograms can be produced. Horizontal Parallax Only (HPO) stereograms provide the viewer with most of the three-dimensional information about the scene, with a greatly reduced number of camera viewpoints and holographic exposures then the full-parallax stereograms. The principles however, apply equally to both HPO and full-parallax stereograms.

There are three stages to the stereogram creation: photographic capture, holographic recording, and final viewing. The holographic stereogram is a means of approximating a continuous optical phenomenon in a discrete form. In display holo-stereography, the continuous three-dimensional information of an object's appearance can be approximated by a relatively small number of two-dimensional images of that object. While these images can be taken with a photographic camera or synthesized using a computer, both capture processes can be modeled as if a physical camera was used to acquire them. The photographic capture, the holographic recording, and the final viewing geometries all determine how accurately a particular holographic stereogram approximates a continuous scene.

There are a number of stereogram capturing methods. For example, some may require a Holographic exposure setup using a single holographic plate comprised of a series of thin vertical slit holograms exposed one next to the other across the plate's horizontal extent. Each slit is individually exposed to an image projected onto a rear-projection screen some distance away from the plate. Once the hologram is developed, each slit forms an aperture through which the image of the projection screen at the time of that slit's exposure can be seen. The images projected onto the screen are usually views of an object captured from many different viewpoints. A viewer looking at the stereogram will see two different projection views through two slit apertures, one through each eye. The brain interprets the differences between the two views as three-dimensional information. If the viewer moves side to side, different pairs of images are presented, and so the scene appears to gradually and accurately change from one viewpoint to the next to faithfully mimic the appearance of an actual three-dimensional scene. Some methods may use multiple recentered camera arrays.

The actual projected image, whose extent is defined by the projection frame, is the visible sub region of the projection screen in any particular view. The projection screen itself is a sub region of a plane of infinite extent called the projection plane.

The projection screen directly faces the holographic plate and slit mechanism or the camera. The viewer interprets the two images stereoscopically. This binocular depth cue is very strong; horizontal image parallax provides most of the viewer's depth sense. Using the observation that a stationary point appears to be at infinity as a landmark, the correct camera geometry needed to accurately capture a three-dimensional scene can be inferred. To appear at infinity, then, an object point must remain at the same position in every camera view. This constraint implies that the camera should face the same direction, straight ahead, as each frame is captured. The camera moves along a track whose position and length correspond to the final stereogram plate. The camera takes pictures of a scene from viewpoints that correspond to the locations of the stereogram's slits. The plate is planar, so the camera track must be straight, not curved. The camera must be able to image the area corresponding to the projection frame onto its film; thus, the frame defines the cross section of the viewing pyramid with its apex located at the camera's position. Because the projection frame bounds the camera's image, the size of the projection frame and its distance from the slit determine the angle of view of the image and thus the maximum (and optimal) focal length of the camera's lens. The film plane of the stereogram capture camera is always parallel to the plane of the scene that corresponds to the projection plane (the capture projection plane) in order to image it without geometric distortions onto the focal plane of the lens.

A stereogram exposure geometry is well suited for objects far from the camera when the image of the object wanders little from frame to frame, always remaining in the camera's field of view and thus always visible to the stereogram viewer. However, distant objects are seldom the center of interest in three-dimensional images because the different perspectives captured over the view zone have little disparity and, as a result, convey little sense of depth. Objects at more interesting locations, closer to the camera, wander across the frame from one camera view to the next and tend to be vignetted in the camera's image at either or both extremes of the camera's travel. The solution to the problem is to alter the capture camera to always frame the object of interest as it records the photographic sequence. Effectively, this change centers the object plane in every camera frame so that it remains stationary on the film from view to view. Object points in front of or behind the stationary plane will translate horizontally from view to view, but at a slower rate than they would in a simple camera stereogram. Altering the camera geometry requires changes in the holographic exposure geometry needed to produce undistorted images. The projection screen is no longer centered in front of the slit aperture during all exposures. Instead, the holographic plate holder is stationary and the slit in front of it moves from exposure to exposure. Thus, the projection frame is fixed in space relative to the plate for all exposures, rather than being centered in front of each slit during each exposure. In this geometry, called the "recentered camera" geometry, only one projection frame position exists for all slits. In effect, as the viewer looks at the final stereogram, the projection frame no longer seems to follow the viewer but instead appears stationary in space. If an image of the object plane of the original scene remains stationary on the projection screen, then, the object plane of the original scene and the projection plane of the final hologram will lie at the same depth.

One type of camera which may take pictures for this type of stereogram is called a recentering camera. Recall that in the simple camera image capture, the image of a nearby object point translated across the camera's film plane as the camera moved down its track taking pictures. In a recentering camera, the lens and the film back of the camera can move independently from each other, so the film plane can be translated at the same rate as the image of the object of interest. The film and image move together through all frames, so just as desired the image appears stationary in all the resulting images. A view camera with a "shifting" or "shearing" lens provides this type of recentering. The lens of the camera must be wide enough to always capture the full horizontal extent of the object plane without vignetting the image at extreme camera positions. A correspondence must exist between the camera capture and the holographic exposure geometries. In the recentering camera system, the necessary translation of the camera's lens adds another constraint that must be maintained. A point in the middle of the object plane must always be imaged into the middle of the film plane, and must always be projected onto the middle of the projection frame. The angle subtended by the object frame as seen from the camera must equal to the angle subtended by the projection frame as seen from the slit. If, for example, the focal length of the lens of the taking camera is changed, the amount of lens translation required and the size of the holographic projection frame would also have to be adjusted.

To summarize, there are two common methods of producing a distortion-free holographic stereogram from a sequence of images: the first in which the projection frame is located directly in front of the slit during each exposure and the plate translates with respect to it (the "simple camera" geometry), and the second in which the screen is centered in front of the plate throughout all the exposures and the slit moves from one exposure to the next (the "recentering camera" geometry). The first method has the advantage that the camera needed to acquire the projectional images is the easier to build, but the input frames tend to vignette objects that are close to the camera. The second method requires a more complicated camera, but moves the plane of the image where no vignetting occurs from infinity to the object plane. The camera complexity of this method is less of an issue if a computer graphics camera rather than a physical camera is used.

The projection frame in a recentered camera stereogram forms a "window" of information in space, fixed with respect to the stereogram and located at the depth of the projection plane. The usefulness of this fixed window becomes important when the slit hologram is optically transferred in a second holographic step in order to simplify viewing. To maintain the capture-recording-viewing correspondence in any stereogram, the viewer's eyes must be located at the plane of the slit hologram. When the stereogram is a physical object, the viewer's face must be immediately next to a piece of glass or film. However, a holographic transfer image can be made so as to project a real image of the slit master hologram out into space, allowing the viewer to be conveniently positioned in the image of the slits, hologram of a real object.

In the simple camera stereogram, the images of the projection frames that the slits of the master project to the transfer during mastering are shifted with respect to each other because each frame image is centered directly in front of its slit. Thus, the frames cannot completely overlap each other. In the case of the recentered camera stereogram, however, all images of the projection frames precisely overlap on the projection plane. When the transfer hologram is made, the position of the transfer plate on the projection plane determines what window of that plane will be visible to the viewer. In the recentering camera stereogram, this window is clearly defined by the projection frame: all information from all slits overlaps there, with no data wasted off the frame's edge. In the simple-camera case, some information from every slit (except the center one) will miss the transfer's frame and as a result will never be visible to the viewer.

A holographic stereogram can of course be cylindrical, for all-round view. In this case, the transparencies can be made by photographing a rotating subject from a fixed position. If the subject articulates as well, each frame is a record of a particular aspect at a particular time. A rotating cylindrical holographic stereogram made from successive frames of movie film can then show an apparently three-dimensional display of a moving subject.

Understanding the optical effects of moving the viewer to a different view distance requires another means of optical analysis called ray tracing. While wavefront analysis is useful when determining the small changes in the direction of light that proved significant in the stereogram's wavefront approximation, ray tracing's strength is in illustrating the general paths of light from large areas, overlooking small differences in direction and completely omitting phase variations. Ray tracing can be used to determine the image that each camera along a track sees, and thus what each projection screen should look like when each slit is exposed. It also shows what part of the projection screen of each slit is visible to a viewer at any one position. Distortion-free viewing requires that the rays from the photographic capture step and the viewing step correspond to each other.

Digital Camera Sensors

A digital camera uses a sensor array (e.g. Charge Coupled Devices—CCD) comprised of millions of tiny electroptical receptors that enables digitization or digital printing of an optical image. The basic operation of the sensor is to convert light into electrons. When you press your camera's shutter button and the exposure begins, each of these receptors is a "photosite" which collects and uses photons to produce electrons. Once the exposure finishes, the camera closes each of these photosites, and then tries to assess how many photons fell into each photosite by measuring the number of electrons. The relative quantity of photons which fell onto each photosite is then sorted into various intensity levels, whose precision may be determined by a bit depth (e.g. twelve bits for each photosite in the image results in a resolution level of $(2^{12})=4095$ possible values). The ability to generate a serial data stream from a large number of photosites enables the light incident on the sensor to be sampled with high spatial resolution in a controlled and convenient manner. The simplest architecture is a linear sensor, consisting of a line of photodiodes adjacent to a single CCD readout register.

A common clocking technique is the 4-phase clocking system which uses 4 gates per pixel. At any given time, two gates act as barriers (no charge storage) and two provide charge storage.

In order to cover the entire surface of the sensor. Digital cameras may contain "microlenses" above each photosite to enhance their light-gathering ability. These lenses are analogous to funnels which direct photons into the photosite where the photons would have otherwise been unused. Well-designed microlenses can improve the photon signal at each photosite, and subsequently create images which have less noise for the same exposure time.

Each photosite is unable to distinguish how much of each color has fallen in, so the above illustration would only be able to create grayscale images. To capture color images, each photosite has to have a filter placed over it which only allows penetration of a particular color of light. Virtually all current digital cameras can only capture one of the three primary colors in each photosite, and so they discard roughly ⅔ of the incoming light. As a result, the camera has to approximate the other two primary colors in order to have information about all three colors at every pixel in the image. The most common type of color filter array is called a "Bayer array", or Bayer Filter.

Bayer Filter

A Bayer filter mosaic is a color filter array (CFA) for arranging RGB color filters, as shown in FIG. 3, on a square grid of photo sensors. The term derives from the name of its inventor, Bryce Bayer of Eastman Kodak, and refers to a particular arrangement of color filters used in most single-chip digital cameras (mostly CCD, as apposed to CMOS).

A Bayer array consists of alternating rows of red-green and green-blue filters. The Bayer array contains twice as many green as red or blue sensors. These elements are referred to as samples and after interpolation become pixels. Each primary color does not receive an equal fraction of the total area because the human eye is more sensitive to green light than both red and blue light. Redundancy with green pixels produces an image which appears less noisy and has finer detail than could be accomplished if each color were treated equally. This also explains why noise in the green channel is much less than for the other two primary colors. Digital cameras that use different digital sensor such as CMOS for example, capture all three colors at each pixel location. The RAW output of Bayer-filter cameras is referred to as a BayerPattern image. Since each photosite is filtered to record only one of the three colors, two-thirds of the color data is missing from each. A Demosaicing algorithm is used to interpolate a set of complete red, green, and blue values for each point, to make an RGB image. Many different algorithms exist.

Demosaicing

Demosaicing is the process of translating an array of primary colors (such as Bayer array) into a final image which contains full color information (RGB) at each point in the image which may be referred to as a pixel. A Demosaicing algorithm may be used to interpolate a complete image from the partial raw data that one typically receives from the color-filtered CCD image sensor internal to a digital camera. The most basic idea is to independently interpolate the R, G and B planes. In other words, to find the missing green values, neighboring green values may be used, to find the missing blue values neighboring blue pixels values may be used, and so on for red pixel values. For example, for linear interpolation, to obtain the missing green pixels, calculate the average of the four known neighboring green pixels. To calculate the missing blue pixels, proceed in two steps. First, calculate the missing blue pixels at the red location by averaging the four neighboring blue pixels. Second, calculate the missing blue pixels at the green locations by averaging the four neighboring blue pixels. The second step is equivalent to taking ⅜ of each of the closest pixels and 1/16 of four next closest pixels. This example of interpolation introduces aliasing artifacts. Improved methods exist to obtain better interpolation.

RAW Image Format

The RAW file format is digital photography's equivalent of a negative in film photography: it contains untouched, "raw" photosite information straight from the digital camera's sensor. The RAW file format has yet to undergo Demosaicing, and so it contains just one red, green, or blue value at each photosite. The image must be processed and converted to an RGB format such as TIFF, JPEG or any other known in the art compatible format, before it can be manipulated. Digital cameras have to make several interpretive decisions when they develop a RAW file, and so the RAW file format offers you more control over how the final image is generated. A RAW file is developed into a final image in several steps, each of which may contain several irreversible image adjustments. One key advantage of RAW is that it allows the photographer to postpone applying these adjustments—giving more flexibility to the photographer to later control the conversion process, in a way which best suits each image.

Demosaicing and white balance involve interpreting and converting the Bayer array into an image with all three colors at each pixel, and occur in the same step. RAW image is then converted into 8-bits per channel, and may be compressed into a JPEG based on the compression setting within the camera. RAW image data permits much greater control of the image. White balance and color casts can be difficult to correct after the conversion to RGB is done. RAW files give you the ability to set the white balance of a photo *after* the picture has been taken—without unnecessarily destroying bits. Digital cameras actually record each color channel with more precision than the 8-bits (256 levels) per channel used for JPEG images. Most \cameras files have a bit depth of 12 or 14 bits in precision per color channel, providing several times more levels than could be achieved by using an in-camera JPEG. This may allow for exposure errors to be corrected. RAW may use different RGB conversion algorithms then the one coded into the camera.

RAW file formats are proprietary, and differ greatly from one manufacturer to another, and sometimes between cameras made by one manufacturer. In 2004 Adobe Systems published the Digital Negative Specification (DNG), which is intended to be a unified raw format. As of 2005, a few camera manufacturers have announced support for DNG.

SUMMARY OF THE INVENTION

There is provided in accordance with some embodiments of the present invention an optical assembly including a set of optical paths. An optical path, according to some embodiments of the present invention, may include a lens and a diaphragm structure, wherein a given optical path's lens and diaphragm structure may be adapted to receive and/or collect optical image information corresponding to one or more features of a given projection plain (e.g. visible features within the given projection plane). Two or more optical paths from the set of optical paths may receive and/or collect optical image information from a common projection plane.

According to some embodiments of the present invention, the projection plane may be flat. According to further embodiments of the present invention, the projection plane may be any other shape, including spherical, cylindrical or any other projection surface which may be defined using optical elements such as lenses.

According to a further embodiment of the present invention, each of the two or more optical paths may direct their respective received/collected optical image information onto an image sensor, which image sensor may be adapted to convert the optical image information into an image data set correlated to the optical image information (e.g. a digital image frame representing the collected optical image). According to further embodiments of the present invention, an image sensor may be adapted to produce a series of image data sets (i.e. series of digital image frames), wherein each image data set is representative of optical information received/collected over a given period of time (e.g. 30 milliseconds).

According to some embodiments of the present invention, each of the two or more optical paths may direct its respective received/collected optical image information onto a separate image sensor, while according to further embodiments of the present invention, the two or more optical paths may direct their received/collected optical image information onto a common image sensor. According to embodiments of the present invention where a common image sensor is used by multiple optical paths, each optical path may either direct its respective collected image onto a separate portion of the image sensor, or two or more optical paths may direct their respective collected images onto overlapping segments on the image sensor. According to even further embodiments of the present invention, two or more optical paths may direct their respective collected images onto a common segment of the image sensor, thereby optically encoding the images.

According to embodiments of the present invention wherein received/collected optical image information from each of multiple optical paths is directed to a separate segment of a common optical sensor, image data produced from each separate optical sensor's segment may be considered a separate image data set (e.g. frame). According to embodiments of the present invention where two or more collected optical images are directed to a common segment on an image sensor (e.g. substantially the entire active/sensing area of the sensor), several methods may be used to produce a separate image data set associated with each of the directed optical images, said methods including: (1) time domain multiplexing, and (2) an encoding/decoding function.

According to embodiments of the present invention employing time domain multiplexing, an optical shutter (e.g. Liquid Crystal Display shutter) may be included as part of each relevant optical path. Time domain multiplexing may be achieved by opening only one given optical path's shutters during a given period, which given period is within an acquisition period during which the image sensor is to produce image data associated with the given optical path. By opening the shutter of each of the relevant optical paths in correlation with the image sensor's acquisition periods, multiple image data sets (i.e. image frames) may be produced, wherein each image data set may be associated with a separate optical path.

According to embodiments of the present invention where optical image information received/collected by each of a set of optical paths is combined (i.e. optically encoded) on a common surface segment of the image sensor during one or more sensor acquisition periods, the optical sensor may produce a composite image data set that may include information relating to an encoded composite of the two or more collected optical images. An encoding/decoding function method or algorithm in accordance with some embodiments of the present invention may be used to encode the two or more collected optical images and decode the composite image data set into two or more separate image data sets, wherein each of the separate image data sets may be associated with and may represent collected optical image information from a single optical path.

According to some embodiments of the present invention, there is provided an image data processing block, implemented either on a dedicated data processor or on a programmable generable purpose processor. One or multiple image processing algorithms may be implemented or executed via the processing block. For example, in accordance with some embodiments of the present invention, the data processing block may be adapted to perform a decoding function of a composite image data set, and in accordance with further embodiments of the present invention, the processing block may be adapted to combine two or more collected images into a multidimensional (e.g. four dimensional) data set, wherein the multidimensional data set may include image data representing various features of the common projection plain.

According to further embodiments of the present invention, there may be provided an image extrapolation block, implemented either on a dedicated data processor or on a programmable generable purpose processor. The image extrapolation block may extrapolate either from the multidimensional data set, from the originally acquired image data sets (i.e. frames) or from the encoded data set of the encoding/decoding function one or more types of derived data sets, wherein each extrapolated data set type may be associated with one or more features of the common projection plain from which the two or more optical paths collected optical image information. Extrapolated data set types may include: (1) a depth map (i.e. z-channel or depth information of every pixel's-point in the common projection plain), (2) a holographic stereogram image of the common projection plain, (3) a stereo image of the common projection plain, and (4) one or more two-dimensional images, where each image may also be an approximated virtual view point of the common projection plain.

According to some embodiments of the present invention, each of the optical paths may include (1) a fixed mirror, (2) a fixed lens and (3) a fixed diaphragm structure. According to further embodiments of the present invention, the lenses and mirrors of two or more optical paths may be functionally associated (e.g. synchronized). According to yet a further embodiment of the present invention, the diaphragms on the two or more given optical paths having functionally associated lenses and mirrors may be adapted to adjust their configuration (e.g. aperture size and shape) so as to maintain a common projection plain between the given optical paths when the focus on the synchronized lenses is changed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 shows a series of graphs depicting the basic principles of space time stereo;

Figure 1B:
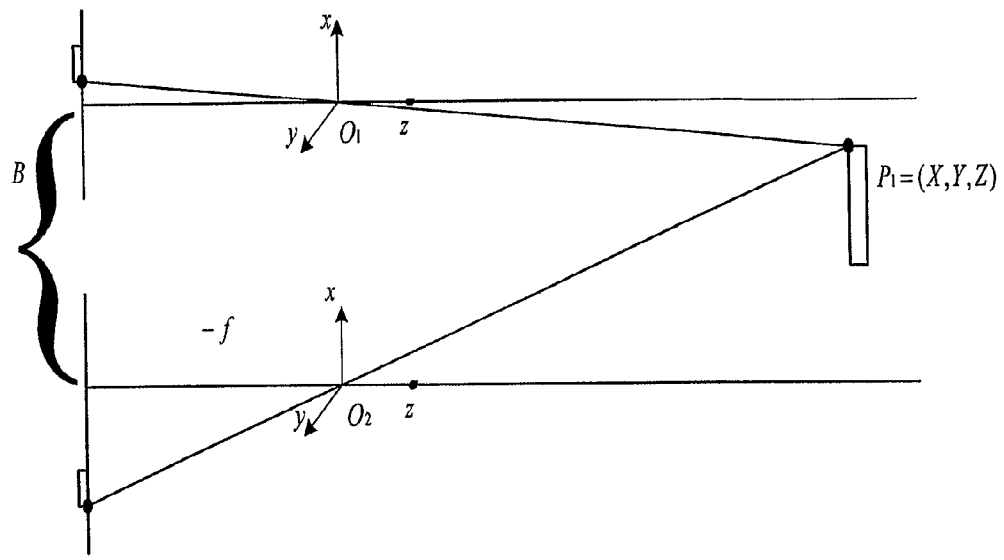
FIG. 1B shows a geometric diagram illustrating the basic principles and formulas relating to generating a disparity map using two sensors.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

There is provided in accordance with some embodiments of the present invention an optical assembly including a set of optical paths. An optical path according to some embodiments of the present invention may include a lens and a diaphragm structure, where a given optical path's lens and diaphragm structure may be adapted to receive and/or collect optical image information corresponding to one or more features of a given projection plain (e.g. visible features within the given projection plane). Two or more optical paths from the set of optical paths may receive and/or collect optical image information from a common projection plane.

According to some embodiments of the present invention, the projection plane may be flat. According to further embodiments of the present invention, the projection plane may be any other shape, including spherical, cylindrical or any other projection surface which may be defined using optical elements such as lenses or mirrors.

According to a further embodiment of the present invention, each of the two or more optical paths may direct their respective received/collected optical image information onto an image sensor, which image sensor may be adapted to convert the optical image information into an image data set correlated to the optical image information (e.g. a digital image frame representing the collected optical image). According to further embodiments of the present invention, an image sensor may be adapted to produce a series of image data sets (i.e. series of digital image frames), wherein each image data set is representative of optical information received/collected over a given period of time (e.g. 30 milliseconds).

According to some embodiments of the present invention, each of the two or more optical paths may direct its respective received/collected optical image information onto a separate image sensor, while according to further embodiments of the present invention, the two or more optical paths may direct their received/collected optical image information onto a common image sensor. According to embodiments of the present invention where a common image sensor is used by multiple optical paths, each optical path may either direct its respective collected image onto a separate portion of the image sensor, or two or more optical paths may direct their respective collected images onto overlapping segments on the image sensor. According to even further embodiments of the present invention, two or more optical paths may direct their respective collected images onto a common segment of the image sensor, thereby optically encoding the images.

According to embodiments of the present invention wherein received/collected optical image information from each of multiple optical paths is directed to a separate segment of a common optical sensor, image data produced from each separate optical sensor's segment may be considered a separate image data set (e.g. frame). According to embodiments of the present invention where two or more collected optical images are directed to a common segment on an image sensor (e.g. substantially the entire active/sensing area of the sensor), several methods may be used to produce a separate image data set associated with each of the directed optical images, said methods including: (1) time domain multiplexing, and (2) encoding/decoding function.

According to embodiments of the present invention employing time domain multiplexing, an optical shutter (e.g. Liquid Crystal Display shutter) may be included as part of each relevant optical path. Time domain multiplexing may be achieved by opening only one given optical path's shutters during a given period, which given period is within an acquisition period during which the image sensor is to produce image data associated with the given optical path. By opening the shutter of each of the relevant optical paths in correlation with the image sensor's acquisition periods, multiple image data sets (i.e. image frames) may be produced, wherein each image data set may be associated with a separate optical path.

According to embodiments of the present invention where optical image information received/collected by each of a set of optical paths is combined (i.e. optically encoded) on a common surface segment of the image sensor during one or more sensor acquisition periods, the optical sensor may produce a composite image data set that may include information relating to some encoded composite of the two or more collected optical images. An optical encoding/decoding apparatus/method or algorithm in accordance with some embodiments of the present invention may be used to encode the two or more collected optical images and decode the composite image data set into two or more separate image data sets, wherein each of the separate image data sets may be associated with and may represent collected optical image information from a single optical path.

According to some embodiments of the present invention, there is provided an image data processing block, implemented either on optical means, a dedicated data processor or on a programmable generable purpose processor. One or multiple image processing algorithms may be implemented or executed via the processing block. For example, in accordance with some embodiments of the present invention, an optical data processing block may be adapted to generate a complex multidimensional data set to be printed on the camera image sensor. In accordance with further embodiments of the present invention a data processing block may be adapted to extrapolate each of the subset of optical paths printed on the camera image sensor.

According to some further embodiments of the present invention—the processing block may be adapted to combine two or more collected images into a multidimensional (e.g. four dimensional) data set, wherein the multidimensional data set may include image data representing various features of the common projection plain (i.e. common surface).

According to further embodiments of the present invention, there may be provided an image extrapolation block, implemented either on optical means, a dedicated data processor or on a programmable generable purpose processor. The image extrapolation block may extrapolate either from the optically encoded complex multidimensional data set, the extrapolated subsets of optical paths printed on the camera image sensor (i.e. the originally acquired image data sets), or the reconstructed multidimensional data set, which multidimensional data set may be one or more types of derived data sets, wherein each extrapolated data set type may be associated with one or more features of the common projection plain (i.e. common surface) from which the two or more optical paths collected optical image information.

According to some embodiments of the present invention, extrapolated data set types may include: (1) a depth map (i.e. z-channel or depth information of every pixel's-point in the common projection plain), (2) a holographic stereogram image of the common projection plain, (3) a hologram image of the common surface, (4) a stereo image of the common surface, and (5) one or more two-dimensional images, where each image may also be an approximated virtual view point of the common surface.

According to some embodiments of the present invention, each of the optical paths may include a fixed mirror, a fixed lens and a fixed diaphragm structure. According to further embodiments of the present invention, the lenses and mirrors of two or more optical paths may be functionally associated (e.g. synchronized). According to yet a further embodiment of the present invention, the diaphragms on the two or more given optical paths having functionally associated lenses and mirrors may be adapted to adjust their configuration (e.g. aperture size and shape) so as to maintain a common projection plain between the given optical paths when the focus on the synchronized lenses is changed.

Figure 4A:
FIG. 4A shows an optical assembly according to some embodiments of the present invention.

Turning now to FIG. 4A, there is shown an optical assembly according to some embodiments of the present invention. As visible from FIG. 4A, the optical assembly has multiple optical paths, which paths may include lenses, mirrors and may also include a diaphragm structure behind each lens/mirror. The configuration of each optical path's diaphragm, lens, mirror and positioning of the optical sensor may define the projection plane from where the optical path may receive optical image information. According to some embodiments of the present invention, two or more of the optical paths on the optical assembly may be configured to acquire optical image information from a substantially common surface. The projection plain (i.e. surface) for each of the two or more optical paths may partially, substantially or totally overlap. The shape of each optical path's projection plain may be flat, spherical, cylindrical or any other shape which may be defined using optical elements such as lenses and mirrors.

Figure 4B:
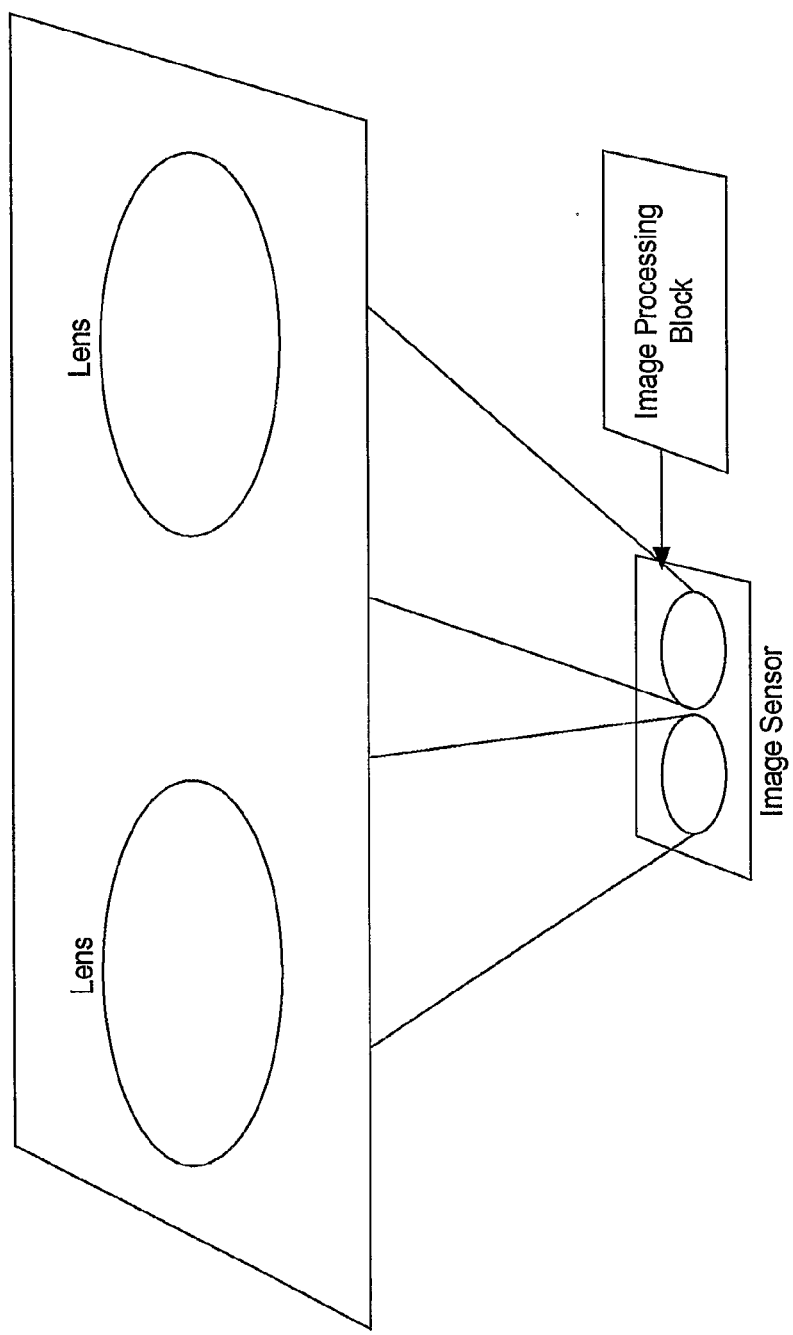
FIG. 4B shows a diagrammatic representation of an optical assembly according to some embodiments of the present invention where optical image information from two separate optical paths are projected onto separate areas of a common image sensor.

FIG. 4B shows a diagrammatic representation of an embodiment of the optical assembly where optical image information from two separate optical paths are projected onto separate areas of a common image sensor. According to such embodiments of the present invention, each area of the optical sensor may correspond with an image frame. For example, if the image sensor outputs an RGB image (may also be in RAW data) from the entire sensor area, an image processing algorithm may parse the image into separate frames.

Figure 4C:
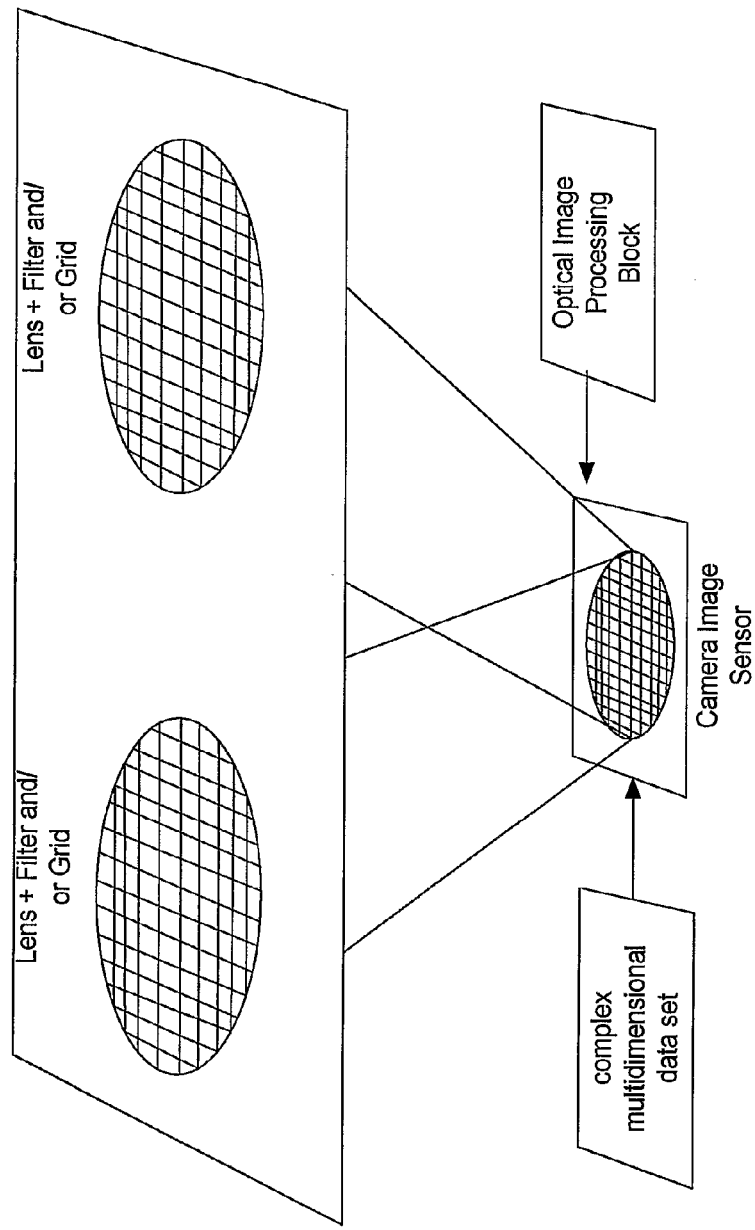
FIG. 4C shows a diagrammatic representation of an optical assembly according to some embodiments of the present invention where optical image information from two separate optical paths is projected onto a common area of a common image sensor.

FIG. 4C shows a diagrammatic representation of an optical assembly according to some embodiments of the present invention where optical image information from two separate optical paths are projected onto a common area of a common image sensor. According to these embodiments, a dedicated lens, an optical filter and/or a grid associated with each optical path may provide for the optical encoding of the optical image information received by each of the optical paths, such that although two or more optical images may be simultaneously printed onto the same area of an image sensor, the two images may later be extrapolated from the sensor's data set (may also be RAW data) using an image processing algorithm, according some embodiments of the present invention.

Figure 5A:
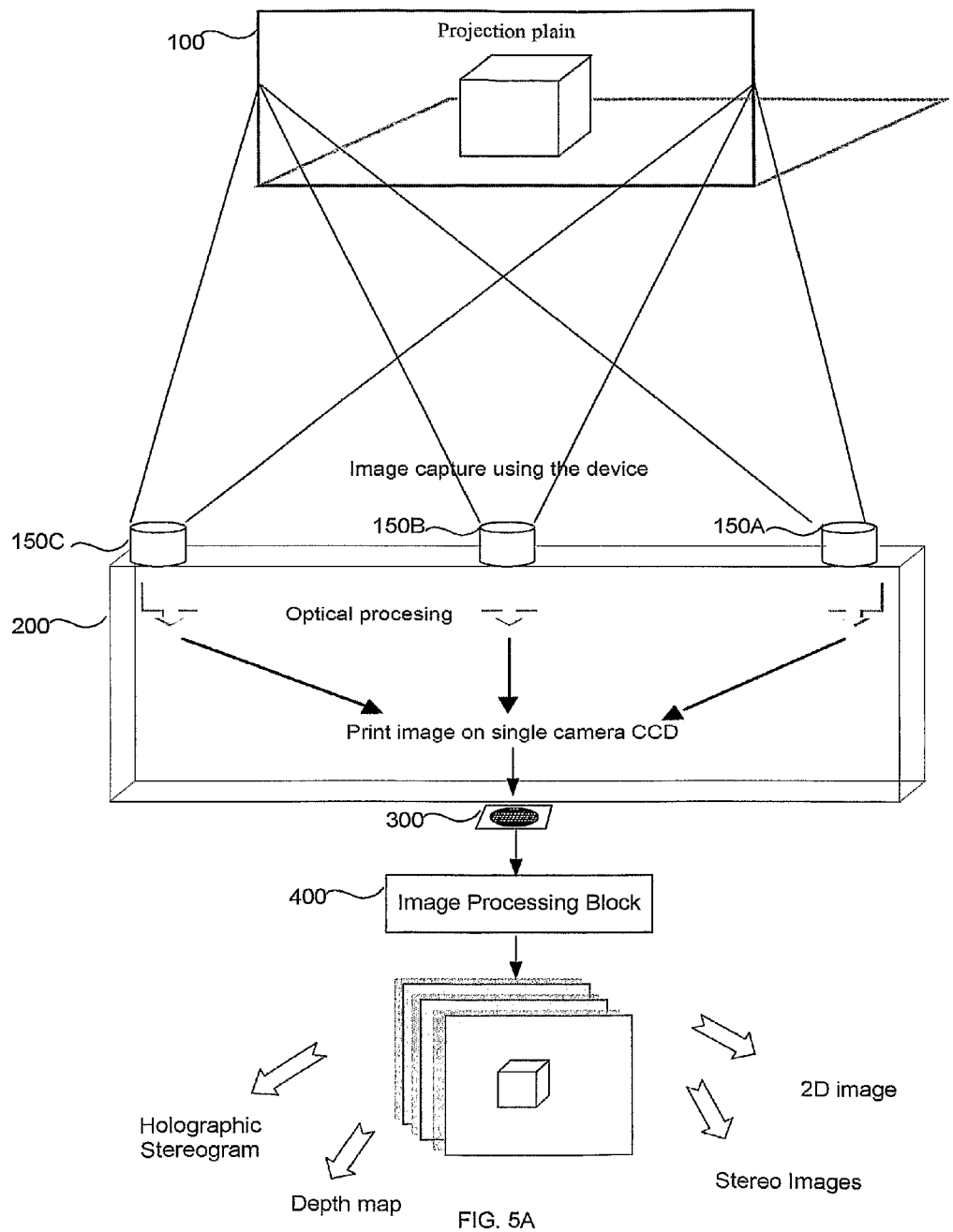
FIG. 5A shows a symbolic diagram of an optical assembly and image processing system, according to some embodiments of the present invention, producing a series of digital image data sets (e.g. frames)

FIG. 5A shows a symbolic diagram of an optical assembly and image processing which according to some embodiments of the present invention produces a series of digital image data sets (e.g. 2D image frames). According to some embodiments of the present invention, the frames may be produced by one or more image sensors. If two or more optical paths direct their respective received/collected optical image information onto a separate area of a common image sensor or onto separate sensors, separate image data sets (i.e. image) frames may be produced directly by the image sensors.

Figure 5B:
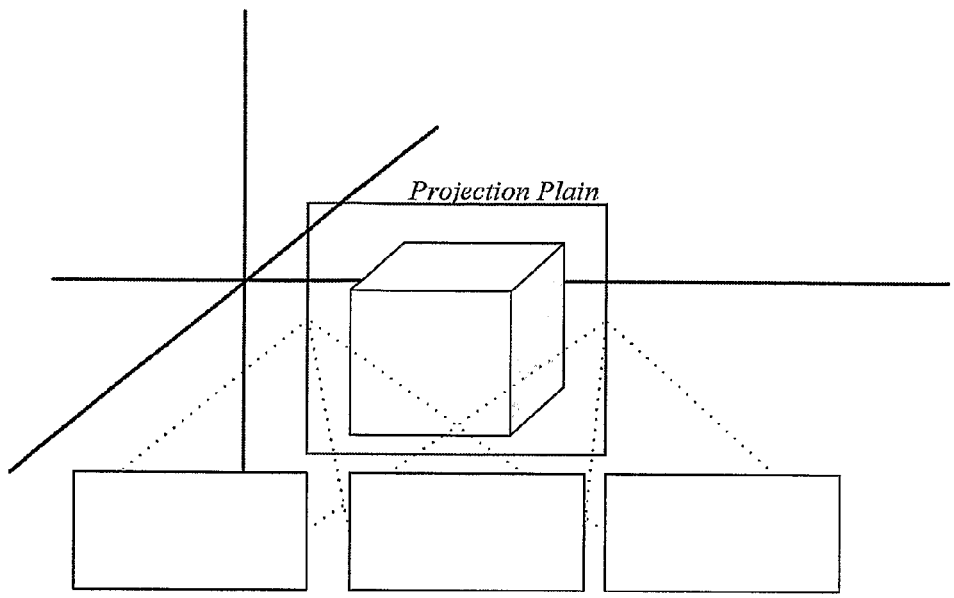
FIG. 5B shows a symbolic diagram depicting multiple images being generated from a multidimensional image data set according to some embodiments of the present invention.
Figure 5C:
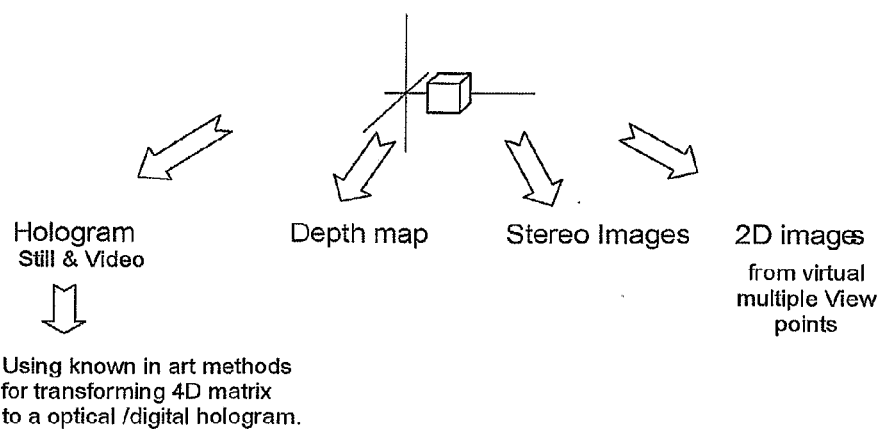
FIG. 5C shows a symbolic diagram depicting various image related data sets being derived from the multidimensional image data set according to some embodiments of the present invention.

When separate image frames of a common projection plain are simultaneously produced through separate optical paths, the separate image frames may be used to generate a multidimensional image data set, for example a three dimensional (3D) depth map representing the projection plane. Examples of calculations associated with calculating depth information on a pixel by pixel basis (disparity map) are shown in FIGS. 5B and 5C, and a detailed explanation is given herein below. According to the present invention, a color may also be associated with each of the pixels in the 3D depth map, using one of several methods according to the present invention. The multidimensional image data set may be extended to yet a further dimension by, for example, using multiple sets of images taken at different times to add a time variable to a colorized or non-colorized 3D depth map, thereby producing a 4D depth map. According to some embodiments of the present invention, as will be described below, a 3D depth map may be generated from a single optically encoded image data set.

Turning now to FIGS. 5B and 5C, there are shown symbolic diagrams depicting multiple images and image related data sets being derived and/or extrapolated from a multidimensional image data set according to some embodiments of the present invention. As will described further below, ray tracing, pixel color interpellation and other image processing methods may be used to convert a multidimensional image data set into a variety of image data types. According to further embodiments of the present invention, certain image data types may be generated directly from acquired image frames.

Figure 6A:
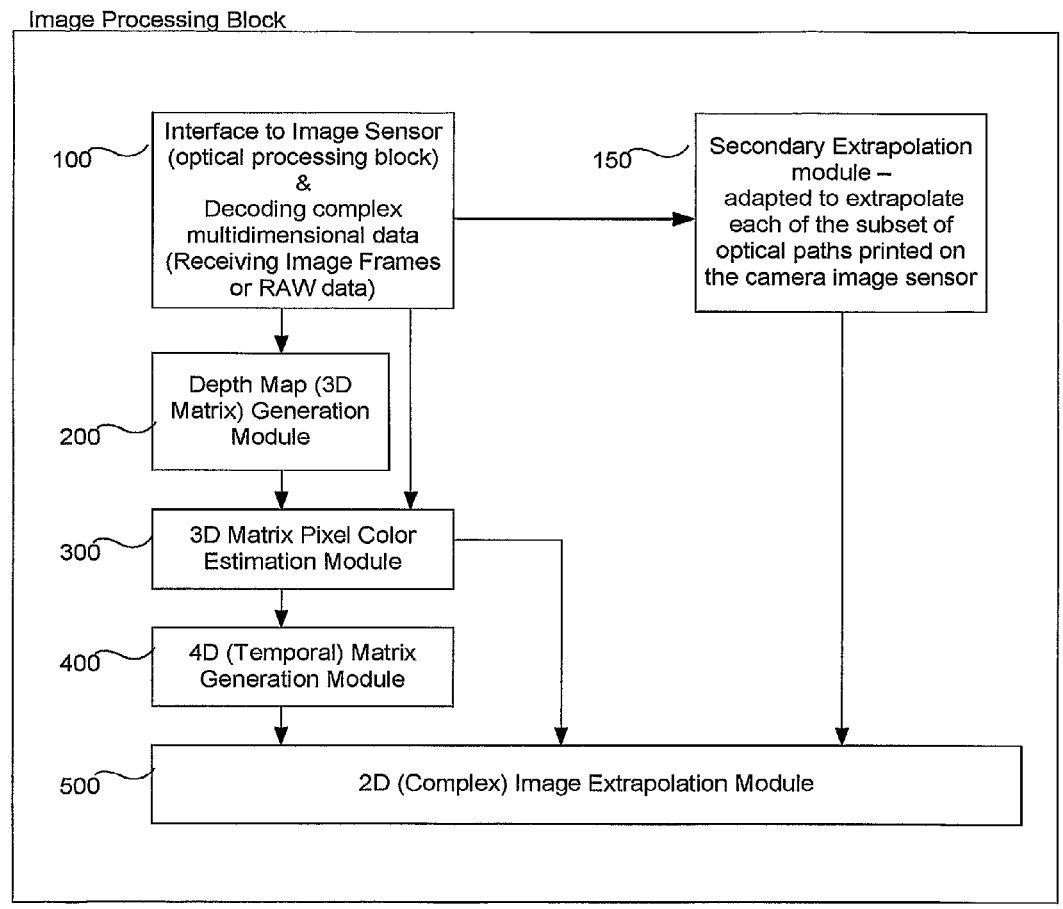
FIG. 6A shows a block diagram representing image processing element/modules according to some embodiments of the present invention.
Figure 6B:
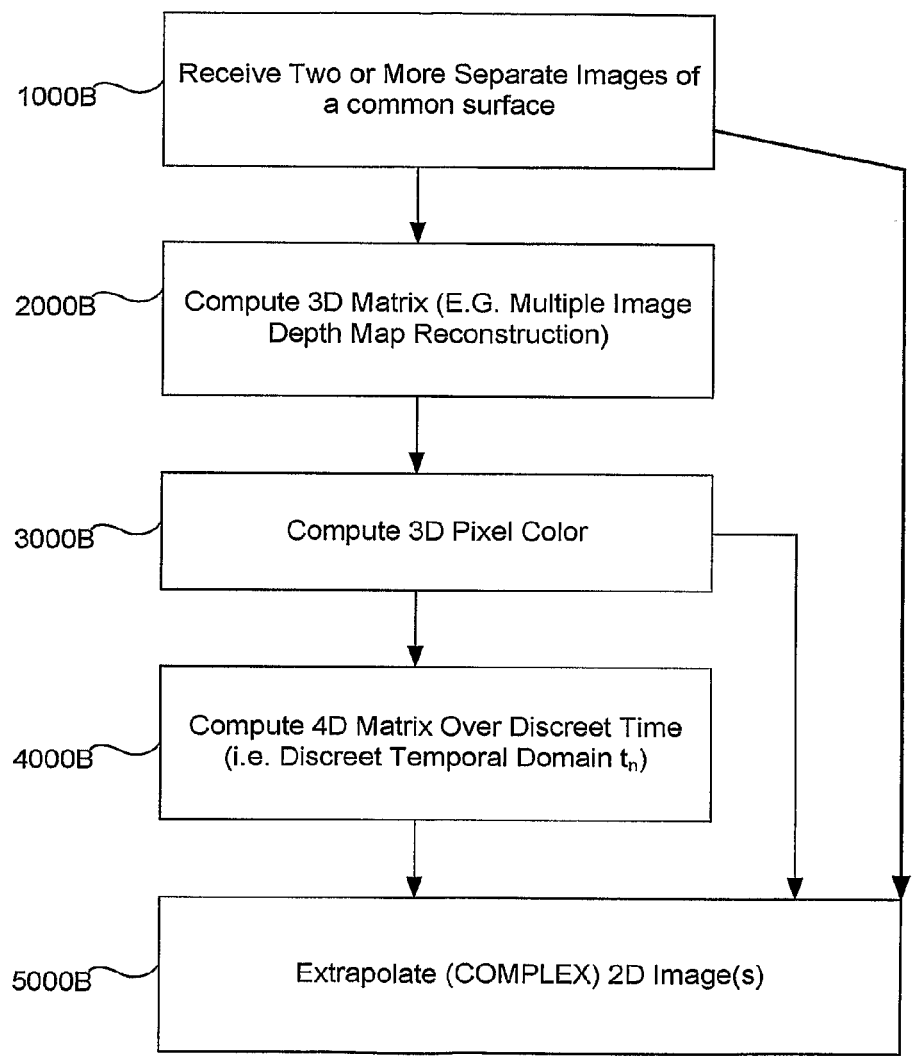
FIG. 6B shows a flow diagram including the steps of producing one or more multidimensional image data sets from two or more acquired image frames according to some embodiments of the present invention.
Figure 6C:
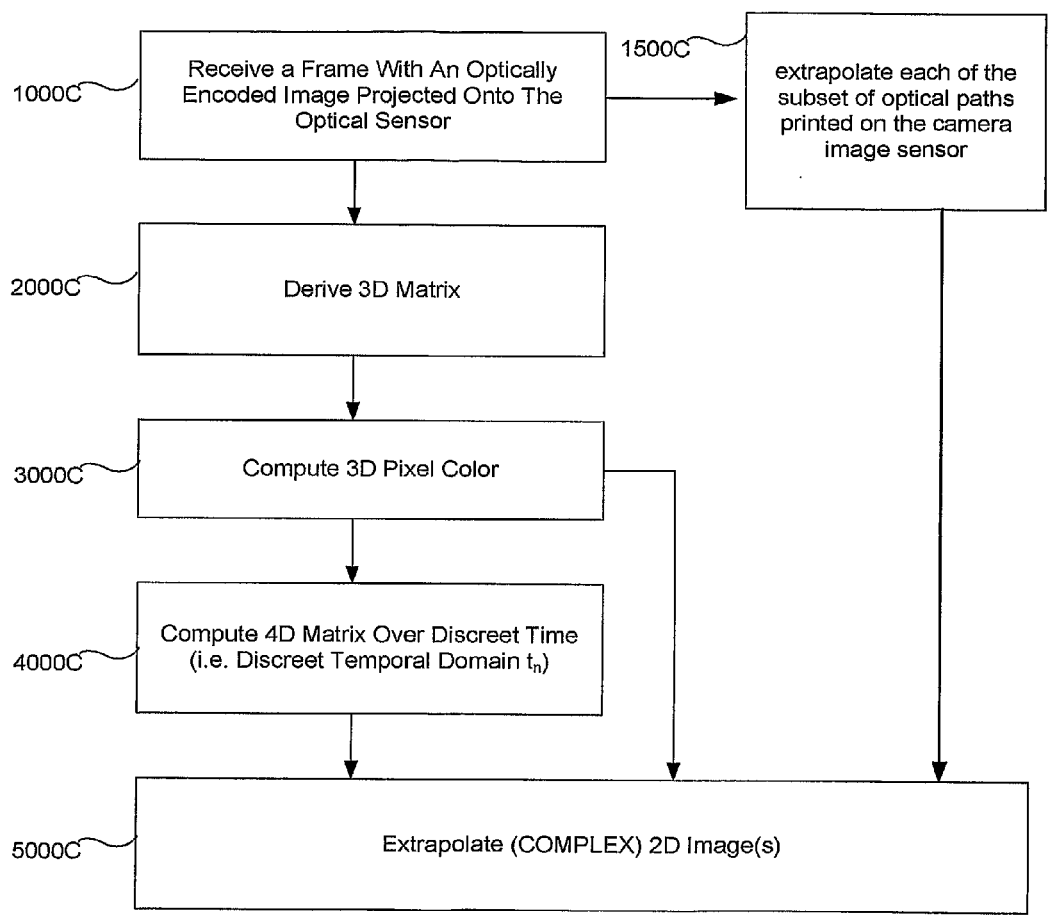
FIG. 6C shows a flow diagram including the steps of producing one or more multidimensional image data sets from an optically encoded image frame according to some embodiments of the present invention.

Turning now to FIG. 6A, there is shown a block diagram showing an image processing element/module according to some embodiments of the present invention. The operation of the various elements of FIG. 6A shall be described in conjunction with the steps of the methods illustrated in FIGS. 6B and 6C, where FIG. 6B shows a flow diagram consisting of the steps of producing one or more multidimensional image data sets from two or more acquired image frames according to some embodiments of the present invention, and FIG. 6C shows a flow diagram consisting of the steps of producing one or more multidimensional image data sets from an optically encoded image frame according to some embodiments of the present invention.

The received image information may either represent separate image frames (step 1000B) or RAW data, where each frame is generated from optical image information coming from a separate optical path, or the received image information may be an optically encoded image data (step 1000C) including optical image information from multiple optical paths mixed onto a common area of an optical sensor.

According to some embodiments of the present invention, the data received by element 100 may be directed towards a secondary extrapolation module and denoted as element 150. the extrapolation unit may be adapted to extrapolate each of the subset of optical paths printed on the camera image sensor (step 1500C), or may be adapted to directly extrapolate (complex) 2D Image(s) (step 5000B) as explained herein bellow.

Figure 1C:
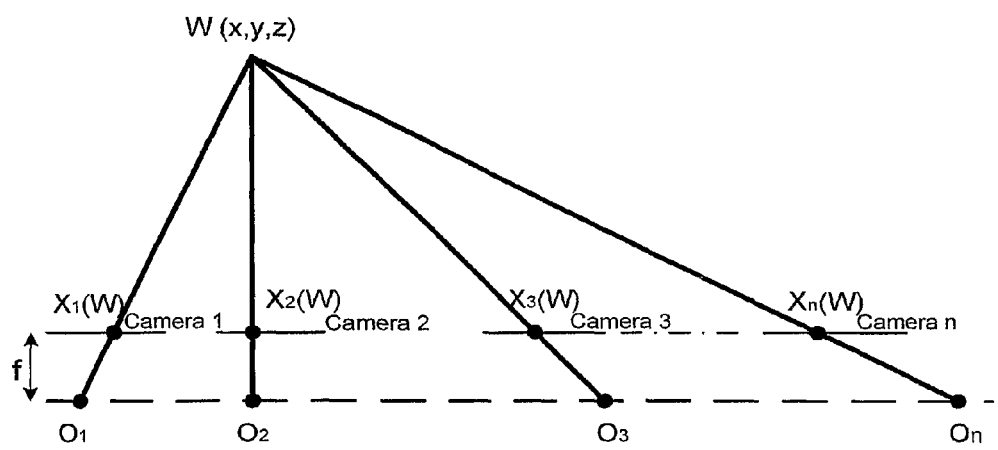
FIG. 1C shows a geometric diagram illustrating the basic principles and formulas relating to generating a disparity map using multiple sensors.
Figure 2:
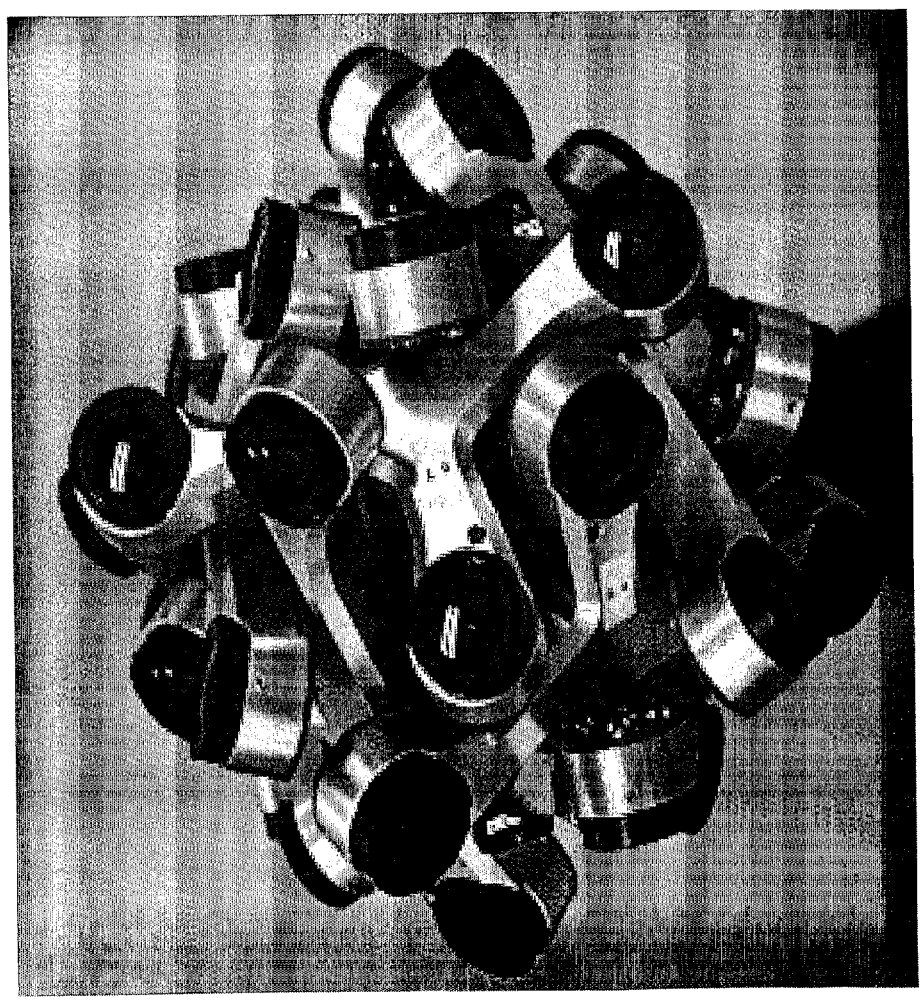
FIG. 2 shows a video camera array that may be used to extrapolate 360 degree depth information using a passive method.

When the received image information is in separate frames, a Depth Map Generation Module 200 may generate a (3D) depth map (step 2000B) using one of various depth extraction algorithms, including the point by point disparity map calculations as illustrated in FIGS. 1B and 1C.

According to some embodiments of the present invention, the received image information may be optically encoded (step 1000C) such that a (3D) depth map may be derived (step 2000C) without having to perform considerable calculations, in which case the Interface to Image Sensor (optical processing block) 100 may be adapted to generate the depth map.

A Color Estimation Module 300 may interpolate a color for each of the points in the depth map (steps 3000B and 3000C). Various color interpolation or estimation methods, including the one described below, may be used.

A 4D matrix generation module 400 may use data associated with multiple depth maps, produced based on images acquired at different times, to generate a multidimensional image data set (steps 4000B and 4000C) which includes time as one of the dimensions.

An image extrapolation module 500 may generate, either from the extrapolated subset of optical paths, in conjunction with the secondary extrapolation module 150, or from a 4D data set, one or more image data types (steps 5000B & 5000C) including simple 2D images from various view points, complex 2D images with encoded depth information, and various others which are described below.

The following text contains examples of various algorithms and methods according to some embodiments of the present invention.

The following algorithm enables simultaneously optically encoding together on the same single capturing sensor (e.g. CCD) multiple different images (up to full sensor resolution for each image), and decoding said multiple images with out loosing resolution for each of said images. The algorithm may input optically acquired images or multiple different sources (e.g. cameras, where the encoding may also be digital).

According to some embodiments of the present invention, the algorithm high level may comprise:
1. Encoding: Using Optical/image processing means.
2. Printing images on digital sensor/frame/data stream.
3. Input complex data from digital sensor/frame/data stream.
4. Decoding complex data, 4D Matrix Reconstruction
5. Output According to some embodiments of the present invention, the Encoding step may comprise:
   a. Input: multiple optically acquired images (e.g. Holo stereo capturing device) or input images from multiple sources (e.g. cameras).
   b. Encoding said images, using optical means or image processing means.

According to some embodiments of the present invention, the Printing images on digital sensor step may comprise:
   a. Simultaneously projecting said encoded images onto a digital sensor. Or, simultaneously printing said encoded images as a single frame or any suitable data stream.

According to some embodiments of the present invention, the input complex data step may comprise:
   a. Input images from digital sensor. Or, Input images from data stream.

According to some embodiments of the present invention, the Decoding complex data step may comprise:
   1. Direct access to information in the complex multidimensional data set,
   2. Extrapolate each of the subset of optical paths or multiple images from said encoded data.
   3. Reconstruct depth maps, 4D dimension matrix
   4. Reconstruct 3D color.
   5. Extrapolate complex data sets According to some embodiments of the present invention, the following text describes an example for an encoding decoding reconstruction and compression Algorithm.

The encoding decoding reconstruction and compression process may be done on images acquired from multiple optical sources where the encoding process is done optically, or from multiple sources such as cameras having no direct link to the holo-stereo capturing device, where the encoding process is done using image processing tools.

We propose a method and apparatus for "digital holography of incoherent light encoding and decoding", reconstructing a 3 dimensional/holographic image within an N dimensional matrix (for the following examples we will use a 4D matrix) from optically acquired 2D multiple images or from ordinary cameras (The "input data"), several projections of a unified projection frame (e.g. surface) illuminated by incoherent light, from different points of view. The encoding process of the input data may be done by optical means or digital means over space-time, to yield a 2D complex function, which is then optically printed on a digital sensor, or computationally processed as a frame or any other form of data stream.

According to some embodiments of the present invention, the decoding and reconstruction process occurs in two stages. The first stage is decoding, performed as the quantized complex 2D function image is loaded into memory, holding a 3D structure or being filtered in to its original encoded particles (e.g. two images). The second stage, de-quantization, reconstructs the 4D matrix.

The final part of the system is a real time image creator given the requested data and geometry (e.g. a 2D slice of the 4D matrix). This is a real time rendering model.

According to some embodiments of the present invention, image processing algorithms may also extrapolate data directly from the decoded data (e.g. 3D extraction of a single point in the image or a depth map) and to view one of the decoded images, with no reconstruction of a 4D matrix.

In stereogram photography, we record several pictures of a projection frame (e.g. surface) from different points of view. The encoded complex 2D function may be reconstructed into a computer generated holographic stereogram—our 4D matrix, reconstructing the original three dimensional projection frame. This means that the image is 3D reconstructed in the vicinity of our 4D matrix, in the horizontal (X) vertical (Y) depth (Z) and time (t) image axis. Consequently, the desired output may be extrapolated to any suitable dedicated means.

To summarize the process, a real world 3-D projection frame is captured by two or more 2D images from several angles. These images are encoded to a complex 2D function as a single frame. The decoded projections of the scene may be computed to a 4D computer generated matrix also extrapolating each of said projection angles, holographic stereogram, depth map, depth perception (stereoscopy) and multiple new 2-D matrix projection angles along X,Y,Z.

4D Matrix Construction and Color Separation methods

A 2D image is a 2D slice of a 4D light field over time. Reconstructing a light field over time from a set of images corresponds to inserting each of the 2D light field slices into a 4D light field representation over time—a 4D matrix. Similarly, generating new views, depth values and so on corresponds to real time extracting and resampling a slice of different data and different views. This requires that the 4D matrix will properly resample each slice rays intersection representation to avoid distortions in the final image data. This process is the 4D data reconstruction.

Alignment of a pair of images from two adjacent camera/image locations on a 2D plane; a given point will project to different locations, potentially several pixels apart, in these two images. The distance between the two projected locations is called the stereo disparity. Extending this idea to multiple camera locations produces a sequence of images in which the object appears to jump by a distance equal to the disparity.

Following this idea, each point in the real world 3D projection frame, holds a certain color we can define as our absolute color, represented in the multiple images on different 2D projections, and following the given conditions this absolute color will be overlaid with distortions creating "color disparity" from the relative points' color and the absolute color. In the 4D matrix, we will strive to reconstruct these points' absolute color. Different angels exposed to the same point will preserve this color with given distortions such as angels, different horizontal positioning in the image, different lighting, optical distortions and so on. But, giving the fact that all projections of the same point, are a percentage of the absolute color of that point's color in reality, we can reconstruct each point's color, interpolating the point's color from the different angels, target to reconstruct the 3D point color as best as can be to the original absolute color of each point.

This process enables compression of multiple images while preserving the basic rolls for practical real time compression:

Data redundancy.—A good compression technique removes redundancy from a signal without affecting its content. Our method enables the 3D interpolation of a point from multiple views enabling a complex 2D function to avoid multiplication of the same data from multiple images.

Random access.—Most compression techniques place some constraint on random access to data. Predictive coding schemes further complicate random access because pixels depend on previously decoded pixels, scanlines, or frames. Our method enables direct random execs to any given point in space and time.

Computational expense.—Our compression scheme of the 4D matrix enables quickly encoding transferring and decoding said images without hardware assistance on the resaving side. while consuming minor computational means.

Exemplary Algorithm

Figure 3:
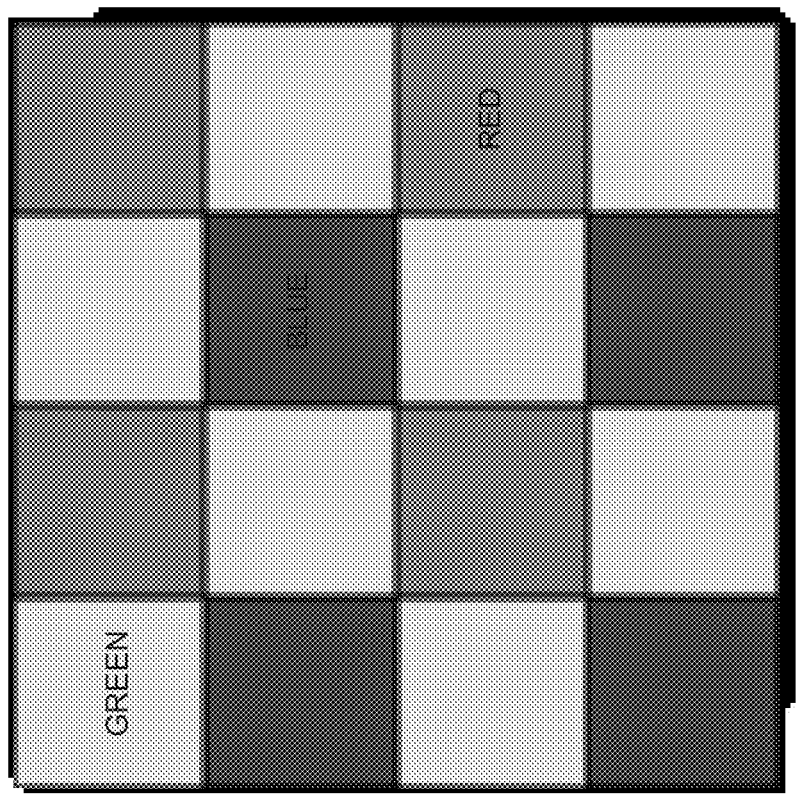
FIG. 3 shows an example of a Bayer filter.

The following example algorithm assumes the case of 3 images taken from 3 lenses (FIG. 5A elements 150A, 150B and 150C) of the holo-stereo capturing device; a single CCD (some cameras have 3CCD array one for each color or CMOS) and Bayer filter (FIG. 3).

The encoding methods may alter pending on the overall settings (input images, optical configurations, 3CCD, CMOS, fps and so on . . . ). But it should be realized to those skilled in the art that it does not change the process of the encoding, decoding, reconstruction and compression algorithm.

Figure 10:
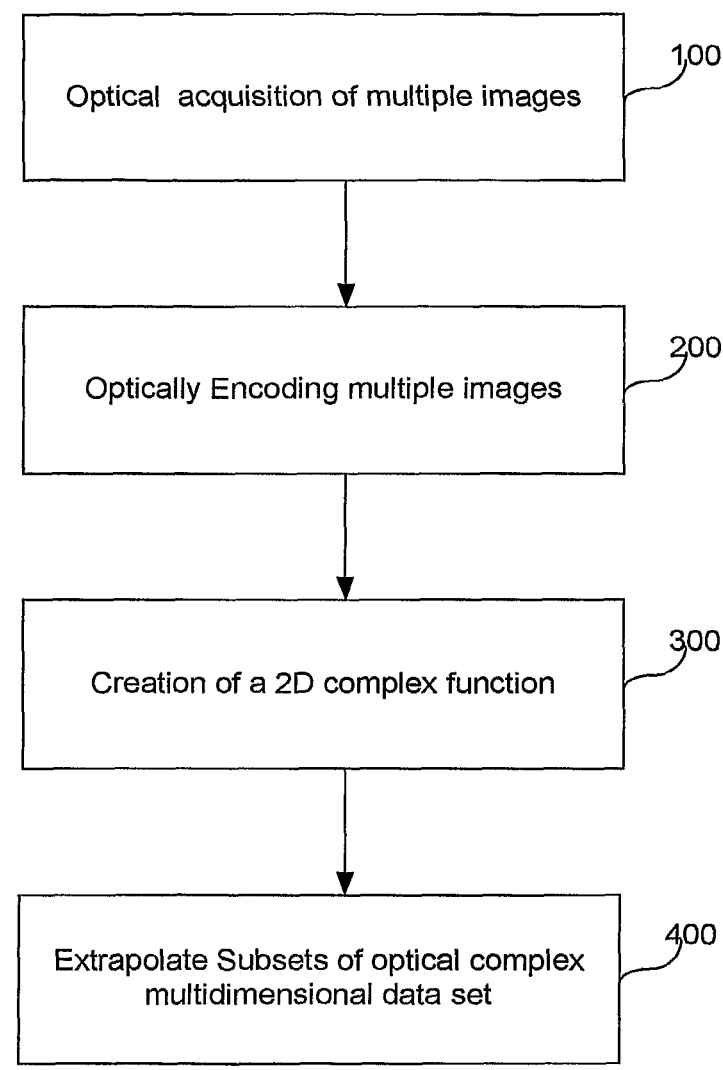
FIG. 10 shows a flow diagram including the steps of an algorithm in accordance with some embodiments of the present invention.

According to some embodiments of the present invention, an encoding/decoding reconstruction and compression algorithm may comprise the following steps and may be described in conjunction with FIG. 10 and FIG. 5A:

1. Optical Encoding 1.1 Input: multiple optically acquired images (FIG. 10 step 100, images may be acquired using elements 150A, 150B and 150C shown in FIG. 5A, wherein the common projection plane is denoted as element 100 of FIG. 5A).

Following the process of optical acquisition, as described earlier, the holo-stereo device now optically holds multiple images in time t'.

1.2 Optically Encoding said images, using optical means (FIG. 10 step 200, the encoding may take place in element 200 (Optical processing block) in FIG. 5A).

1.3 Creation of a 2D complex function that holds the information from the multiple optically acquired images (FIG. 10 step 300, element 300 in FIG. 5A)

1.4 Extrapolate Subsets of optical complex multidimensional data set (FIG. 10 step 400, the extrapolation may take place in element 400 (Image processing Block) of FIG. 5A) The Encoding algorithm (i.e. optical process) itself may vary (e.g. encoding using color, Fourier, Diffraction, Fresnel, Spatial etc), and it is not limited to specific configuration, the following example is not a limiting one.

Following are Three Exemplary Optical Encoding Methods—

Denote:
Image 1=I1, its color: R1G1B
Image 2=I2, its color: R2G2B2
Image 3=I3, its color: R3G3B3

Figure 7A:
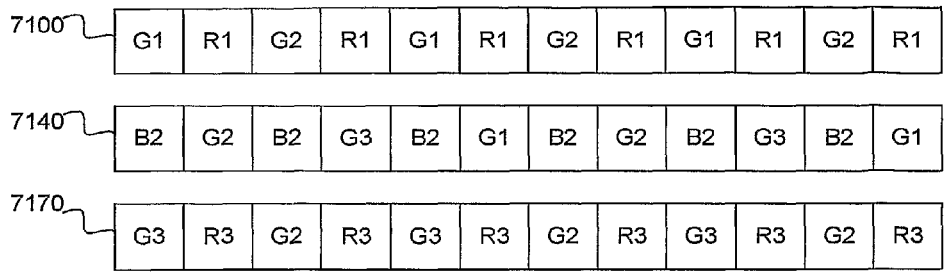
FIGS. 7A, 7B and 7C show exemplary filters according to some embodiments of the present invention.

The encoding in this example may be the following:

Method 1:
Projecting the images through dedicated filters such that the green color will enable the disparity maps reconstruction. Since it is best to have the same color to enable disparity maps of multiple images (different colors from different images may not be accurately matched), and since the CCD holds ½ amount of Green, ¼ red ¼ blue, and disparity in horizontal parallax is done on horizontal vectors, we will use the green in the rows to enable initial disparity maps. The encoding may be in the form of projecting said input images through optical filters such that said images are projected on said CCD as shown in FIG. 7A, Line 1 (7100), Line 2 (7140) and Line 3 (7170), wherein red color is denoted by "R", blue color is denoted by "B", and green color is denoted by "G".

Some color points are missing on different images, their signature can be printed on the digital sensor using the physics attributes of the digital sensor. We may also use different spatial deviation on the CCD.

Method 2:
Enhancing said images optical signature on the digital sensor using the reaction of each CCD receptor to light, or the amount of data each pixel may hold in a single frame or any means of data transfer.

The numbers of photons in each photo sensor on the CCD may interpreted to digital values from 0 to 2^12 using 12 bit for each sensor in some RAW files and even higher bit for each sensor.

Method 2 exploits the potentially larger bandwidth of each photo sensor in terms of digital light printing, as if to exploit the total CCD information more then the usual output value of the pixel (mostly 8 bit per pixel per each color). Using filters to optically vary the values of image points during the projection step on the CCD sensor, larger values may be collected and later interpreted to digital terms in a 12 bit array or more. Understanding the idea that the image sensor can be looked at as an optical memory unit, where values can be analyzed as digital values of a memory unit. Using higher storage values and optical encoding manipulations, one can encode and extrapolate number of values to be decoded as different images.

One example for this method is given bellow.

Method 3:
Projecting the set of optical paths through dedicated optical means, for example by diffraction. The set of optical paths in the formation of Fresnel and/or Kirchhoff and/or Frauenhoffer diffraction are convoluted and recorded on a camera image sensor and stored digitally.

The decoding and reconstruction is performed by numerical means based on the use of fast Fourier transform (FFT), and may also use spatial and/or temporal filtering as well polarization means.

2. Printing Images on Digital Sensor:
Simultaneously projecting said encoded images on digital sensor.

3. Input Image from Digital Sensor:
Input images from digital sensor may also be in a 12 bit RAW format, and may also be prior to a color interpolation processes (e.g. Demosaicing).

4. Decoding Complex Data, 4D Matrix Reconstruction.

4.1 Decoding Complex Multidimensional Data Set Process is done in order to extrapolate each of the subset of optical paths printed on the camera image sensor. Multiple data sets may be extrapolated directly from the complex multidimensional data set and/or from the extrapolated subset of optical paths. Following the decoding process is the 4D matrix reconstruction.

In the case of spatial encoding images might be reconstructed by reading the dedicated pixels from their printed coordinates on the CCD, thus reconstructing a subset of optical paths. Diffracted optical paths in the formation of Fresnel and/or Kirchhoff and/or Frauenhoffer diffraction that are convoluted and recorded on a camera image sensor and stored digitally.

The decoding and reconstruction is performed by numerical means based on the use of fast Fourier transform (FFT), and may also use spatial and/or temporal filtering as well polarization means.

Complex multidimensional data sets based on color interpolation may be extrapolated by spatial and/or time decoding, by digital values interpolation as in the example of method 2, and in a 3D reconstruction process 4.2 Reconstruct Multiple Images' Depth Maps in a 3D Matrix (XYZ)

Following the process of encoding the complex multidimensional data set, multiple data sets may be extrapolated directly from the complex multidimensional data set and/or from the extrapolated subset of optical paths (e.g. extrapolate depth maps of the input images), or to reconstruct a unified 3D image in a 4D matrix. In the following example the subset of optical paths of the complex multidimensional data set is the input for the 3D structure (depth reconstruction) placed in the 3D matrix. Depth extraction using image color information is best performed using the same color of the different images. Different colors might not extrapolate proper depth maps (even if we convert them to gray scale for example), because different color acquisition print different visual signatures on the image (such as a red table will leave low green or blue signatures if any). Since in the following not limiting example, we are using a single CCD with Bayer filter, the green holds half of the sensor original points, and since the depth map is done on the rows of the image to check the parallax disparity between the images, we need to enable a row of green for the first I1 camera (the left one), and on the same row, a row of green for the second image I2, to enable depth calculation.

Figure 7B:
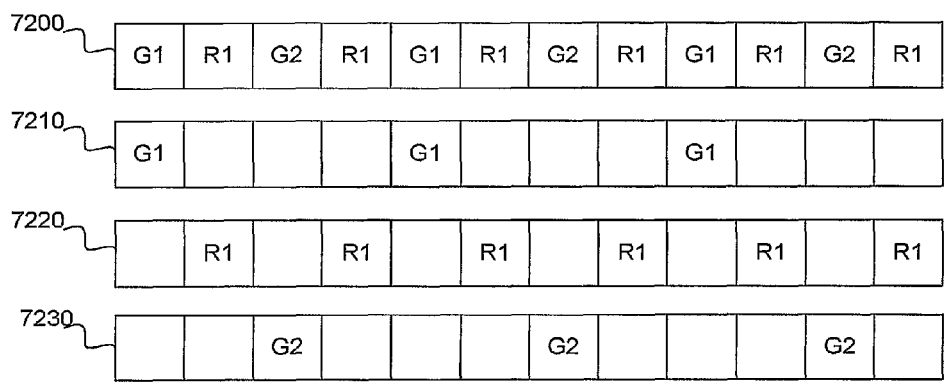

Turning now to FIG. 7B, there is shown the exemplary filter described hereinabove, the first encoded row/line is denoted by 7200. We will separate each element (G1/G2/R1) and receive the filters denoted by 7210, 7220 and 7230.

It should be clear to one of ordinary skills in the art that the Red resolution of image 1 was not damaged.

Figure 7C:
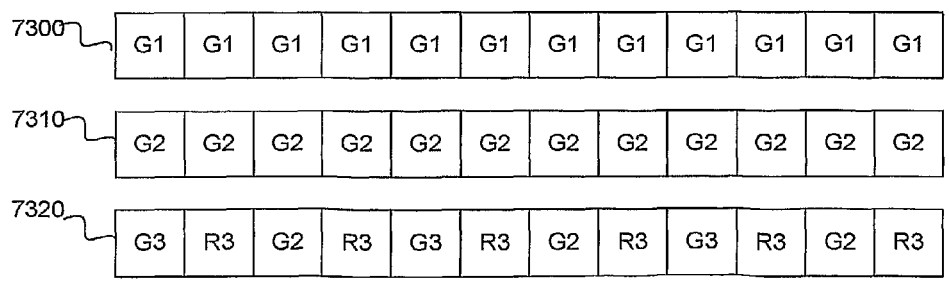

The outcome of reconstructing the vector color of each image for disparity purposes is shown in FIG. 7C, wherein line 1 is denoted by 7300, and line 2 is denoted by 7310.

We will use these rows to create a disparity map, depth map of the first row of images 1 & 2 using previously dedicated algorithms as previously discussed and as will further be explained by example algorithms, and place the registered rows in a 3D matrix. The 3D rays' intersection of the original 3D projection frame (surface) are aligned.

Having positioned the points in 3D, we can now reconstruct the green vector color of row one & two using projected green from image 1, 2. And following the same process on lines 2 & 3, we will enable a proper disparity map for images 2 & 3, as seen in 7330.

Figure 8:
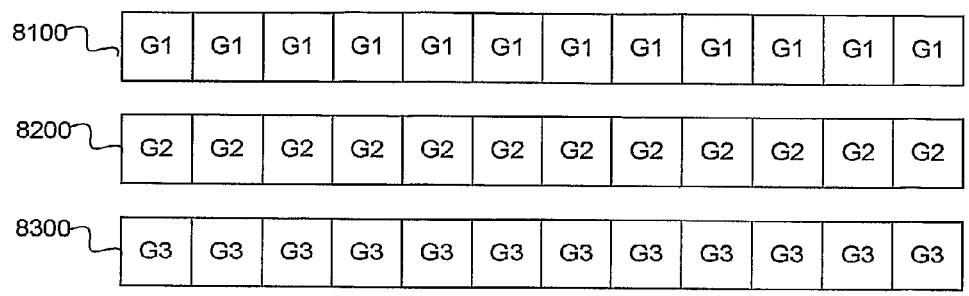
FIG. 8 shows an exemplary filter according to some embodiments of the present invention.

The positioned points in 3D, may enable us to reconstruct the green (or full RGB) as will further be explained to rows 1, 2, 3—images 1, 2, 3, as seen in FIG. 8

4.2 Reconstruct 3D Color in the 3D Matrix.

The reconstruction of RGB for 3D point p' is performed in the following not limiting example: following the fact that we aligned in 3D the two images we now have for example the red color from image 1-line 1, as explained earlier, its resolution was not damaged, we also have the blue color of the same example point p' from image 2 line 2, blue color resolution was also not harmed, and since we also reconstructed the green in both rows, we can now interpolate and reconstruct the RGB for point p' based on the 3D location of neighboring pixels rather then on their original 2D position on the CCD in the first and second line.

The major difference of 3D color reconstruction in the 3D matrix with respect to the 2D RAW file Demosaicing, is the 3D positioning of each point in the 3D matrix, reconstructing the 3D structure of the projection frame in the real world, Rays intersect in 3D, as opposed to their 2D location in the 2D image, each point in the 3D matrix resaves color from at list two different view points. In our example, in line 1 point Pi receives red and green from image 1 and green from image 2, in the 2nd line receives green from image 1, green and blue from image 2, and so the ratio of ½ amount of green, ¼ amount of R and ¼ amount of B is kept for each point, the 3D rays intersection allows for accurate positioning of 3D color, and the 3D Demosaicing will now take place, reconstructing a 3D color point in space, the Demosaicing is based on the 3D neighboring pixels from each image point of view up to a (neighboring) trash hold, fully reconstructing the image lines, up to a full array of 12 bit (or more) per point of red, full array of 12 bit (or more) per point of blue, and same for green.

Distortions on the reconstructed color will be 4D filtered over space and time.

4.3 Extrapolate Full RGB for Each of Input Images and Arbitrary Camera Positions since we now hold a XYZt', RGB-3D color for each point in the 4D matrix, we can generate 2D images also from arbitrary camera positions with depth information. An image is a 2D slice of the 4D light field.

The pervious example was compression over space, where compression over time may also be generated using said encoding in the 4D matrix, adding the temporal vector to the XYZ spatial coordinates and RGB.

If the compression algorithm is used for compression of data transfer, the 4D matrix may be done only once, on the compressing side. Following the 4D matrix digital reconstruction, a new 2D complex function might be generated that encapsulates each pixels, RGB, XYZ, where the Z value might be encapsulated in the image data by, for example as previously mentioned in method 2, using higher bit values for each pixels (need only one extra value to RGB XY—the Z), enabling to immediately decode the 4D image on the receiving side with very low computation needs.

Following is a simple numerical example to the 3D reconstruction and compression algorithm, using image processing means (i.e. the input are two images). The image pixels are represented in their digital representation, enabling to accurately value the compression process, and also in a printed version.

The input is 2×2D images. The algorithm comprises the steps of: (1) reconstruct a 3D matrix, (2) encode said matrix to a 2D complex function, enabling computation less decoding on the receiving end.

Figure 9A:
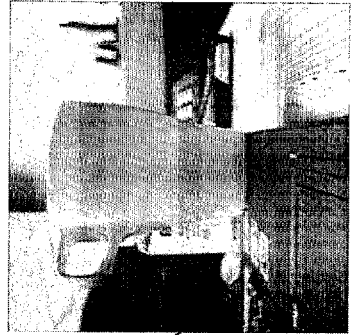
FIG. 9A shows two images which are used as an input to an algorithm according to some embodiment of the present invention.

Turning now to FIG. 9A there is shown two input images for this example, the left image is denoted by 9100 and the right image is denoted by 9200. The first step is extracting a depth map. The input images are full array of RGB each, accordingly a depth map can be reconstructed as previously explained on all image layers:

The end process is the positioning of pixels in a 3D space, intersecting rays from both images.

Figure 9B:
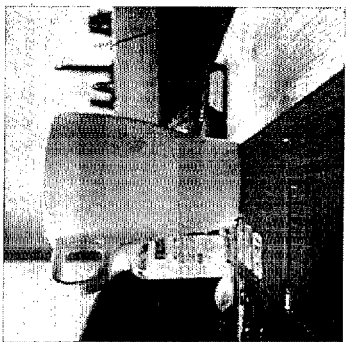
FIGS. 9B and 9C show the outcome of image processing, which is performed in accordance with some embodiment of the present invention.
Figure 9B:

Turning now to FIG. 9B there is shown a region positioned on the same depth, of the Mobile phone that is located on the right of the white cap of coffee, the left image is denoted by 9300 and the right image is denoted by 9400

A vector of pixels on the same depth of one color from two images would look like that:

| R | 42 | 42 | 33 | 21 | 13 | 14 | 28 | 58 | 97 | 144 | 176 |
| L | 45 | 42 | 36 | 30 | 18 | 17 | 26 | 51 | 95 | 138 | 179 |

Having positioned every pixel in the image in a 3D space we can unify its color by interpolating the intersected rays, encapsulating them in to a single pixel. The interpolated image may be the following example (3XMatrix layers for Red Green and Blue $$M2(:,:,1) = \begin{matrix}
0 & 1 & 0 & 0 & 0 & 0 & 0 & 0 & 0 & 0 & 0 & 0 & 1 \\
0 & 43 & 42 & 34 & 25 & 15 & 15 & 27 & 54 & 96 & 141 & 177 & 0 \\
0 & 38 & 34 & 25 & 18 & 12 & 16 & 38 & 71 & 117 & 165 & 204 & 0 \\
0 & 32 & 23 & 14 & 9 & 14 & 30 & 59 & 100 & 146 & 192 & 227 & 0 \\
0 & 28 & 15 & 5 & 7 & 19 & 43 & 84 & 133 & 176 & 217 & 240 & 0 \\
0 & 23 & 11 & 7 & 11 & 29 & 61 & 114 & 167 & 205 & 230 & 250 & 1 \\
0 & 18 & 11 & 11 & 25 & 51 & 89 & 146 & 196 & 226 & 244 & 249 & 0 \\
0 & 16 & 11 & 20 & 47 & 84 & 130 & 182 & 222 & 244 & 251 & 247 & 1 \\
0 & 16 & 20 & 38 & 72 & 118 & 164 & 211 & 238 & 249 & 251 & 242 & 0 \\
0 & 19 & 35 & 63 & 101 & 147 & 191 & 225 & 245 & 250 & 242 & 227 & 0 \\
1 & 30 & 57 & 92 & 130 & 173 & 212 & 235 & 243 & 241 & 226 & 209 & 0 \\
0 & 47 & 84 & 125 & 162 & 196 & 222 & 232 & 234 & 224 & 207 & 188 & 0 \\
0 & 65 & 107 & 149 & 183 & 210 & 225 & 229 & 222 & 210 & 190 & 171 & 0 \\
1 & 83 & 122 & 160 & 190 & 211 & 224 & 221 & 210 & 198 & 178 & 161 & 0 \\
1 & 101 & 139 & 171 & 196 & 209 & 212 & 206 & 194 & 182 & 171 & 155 & 2 \\
0 & 0 & 0 & 0 & 0 & 0 & 0 & 0 & 0 & 0 & 0 & 0 & 0
\end{matrix}$$

$$M2(:,:,2) = \begin{matrix}
0 & 0 & 0 & 0 & 0 & 0 & 0 & 0 & 0 & 0 & 0 & 0 & 0 \\
0 & 44 & 45 & 37 & 27 & 18 & 18 & 31 & 59 & 103 & 149 & 183 & 1 \\
0 & 39 & 36 & 28 & 20 & 17 & 21 & 44 & 77 & 124 & 172 & 211 & 0 \\
0 & 33 & 24 & 15 & 13 & 18 & 34 & 65 & 107 & 154 & 198 & 235 & 0 \\
0 & 28 & 16 & 9 & 10 & 24 & 49 & 92 & 140 & 184 & 223 & 248 & 0 \\
0 & 23 & 14 & 9 & 14 & 32 & 66 & 118 & 171 & 211 & 237 & 253 & 0 \\
0 & 19 & 13 & 13 & 28 & 52 & 91 & 148 & 201 & 231 & 250 & 252 & 0 \\
0 & 16 & 13 & 23 & 50 & 86 & 131 & 184 & 226 & 246 & 254 & 250 & 0 \\
1 & 18 & 22 & 40 & 74 & 120 & 167 & 213 & 241 & 252 & 254 & 244 & 0 \\
0 & 22 & 37 & 64 & 102 & 149 & 193 & 224 & 245 & 250 & 243 & 227 & 0 \\
0 & 31 & 59 & 93 & 132 & 175 & 213 & 234 & 244 & 242 & 227 & 210 & 0 \\
0 & 48 & 85 & 127 & 164 & 198 & 224 & 232 & 234 & 223 & 207 & 189 & 0 \\
0 & 66 & 108 & 151 & 184 & 212 & 227 & 230 & 224 & 209 & 188 & 173 & 0 \\
0 & 84 & 124 & 162 & 193 & 213 & 226 & 219 & 210 & 195 & 176 & 162 & 0 \\
0 & 102 & 141 & 172 & 197 & 210 & 214 & 205 & 193 & 179 & 166 & 154 & 0 \\
0 & 1 & 0 & 0 & 0 & 0 & 0 & 0 & 0 & 0 & 0 & 1 & 0
\end{matrix}$$

$$M2(:,:,3) = \begin{matrix}
0 & 1 & 0 & 1 & 1 & 0 & 0 & 0 & 0 & 0 & 0 & 0 & 0 \\
0 & 45 & 44 & 38 & 30 & 19 & 20 & 32 & 61 & 104 & 150 & 184 & 4 \\
0 & 40 & 36 & 30 & 23 & 19 & 23 & 45 & 77 & 125 & 174 & 212 & 2 \\
0 & 35 & 26 & 18 & 15 & 20 & 37 & 65 & 108 & 156 & 201 & 236 & 1 \\
0 & 31 & 18 & 12 & 12 & 26 & 51 & 91 & 140 & 186 & 226 & 248 & 0 \\
0 & 26 & 17 & 13 & 17 & 36 & 69 & 120 & 172 & 213 & 239 & 253 & 0 \\
0 & 21 & 16 & 15 & 30 & 55 & 94 & 149 & 203 & 233 & 251 & 253 & 1 \\
0 & 19 & 15 & 24 & 50 & 86 & 133 & 182 & 222 & 241 & 248 & 244 & 0 \\
1 & 19 & 23 & 40 & 74 & 120 & 166 & 209 & 235 & 246 & 244 & 237 & 0 \\
1 & 23 & 38 & 67 & 104 & 149 & 193 & 220 & 240 & 241 & 232 & 218 & 2 \\
1 & 33 & 59 & 94 & 132 & 175 & 212 & 229 & 237 & 231 & 216 & 199 & 2 \\
0 & 48 & 84 & 126 & 161 & 194 & 220 & 224 & 226 & 216 & 197 & 179 & 0 \\
2 & 68 & 108 & 150 & 182 & 209 & 223 & 223 & 214 & 201 & 179 & 161 & 0 \\
0 & 83 & 121 & 158 & 187 & 206 & 220 & 211 & 202 & 184 & 167 & 149 & 0 \\
0 & 100 & 136 & 169 & 191 & 206 & 211 & 199 & 185 & 167 & 157 & 142 & 0 \\
1 & 0 & 0 & 0 & 0 & 0 & 1 & 0 & 0 & 0 & 0 & 0 & 4
\end{matrix}$$

Figure 9C:
Figure 9C:

The graphical outcome of the above explained manipulations is depicted in FIG. 9C.

Printing the image pixels as a single image, we would also want to add their Z value so that the receiving end of the data will not need computation. Using mathematical manipulations similar to the second previously mentioned method, The outcome 2D complex function would be XYZ RGB, for every pixel in the image.

5. Output 5.1 Output from the 4D Matrix

Fast generation of different data and views, is generated by rendering a 2D array of image data, wherein the 2D slice of the 4D matrix represents rays through a point, properly resampled to avoid artifacts in the final image data.

5.1.1 Holographic Stereogram (still & Video):

5.1.2 Extrapolate multiple discrete dedicated view points to Holographic Stereogram display device.

5.1.3 Using digital holography (e.g. Fourier transform and Fresnel diffraction as previously discussed) to digitally project said 4D matrix as a 2D image for digital holography future reconstruction.

5.1.4 Depth map: extrapolate Z channels of the 4D matrix.

5.1.5 Depth Perception: extrapolate stereo discrete view points to stereoscopy display device.

5.1.6 2D images (from multiple view points): extrapolate a discrete view point to suitable display device.

5.2 Output following the decoding process of the complex multidimensional data set without 4D matrix reconstruction. The optically encoded complex multidimensional data set holds the 3D attributes of the photographed projection frame (as previously explained).

5.2.1 One can access these attributes and extrapolate the information directly from the 2D complex function.

5.2.2 The encoding process may also enable extrapolation of, for example, the multiple 2D images of the projection frame.

5.2.3 Once the multiple 2D images of the projection frame are decoded, the images may be viewed directly as 2D images of the projection frame.

5.2.4 Depth information of desired 2D points, image parts, and full depth maps using passive methods may be extrapolated, as will further be explained, from the multiple images of the projection frame.

5.2.5 One can also output the multiple images for holographic stereogram and stereoscopic display.

5.2.5.1. Using images from each slit for viewing, a viewer looking at the stereogram will see two different projection views through two slit apertures, one through each eye. The brain interprets the differences between the two views as three-dimensional information. If the viewer moves side to side, different pairs of images are presented, and so the scene appears to gradually and accurately change from one viewpoint to the next to faithfully mimic the appearance of an actual three-dimensional scene.

5.3 Stereographic and Stereoscopic Display Algorithm

Processing algorithm for creating holographic-stereogram and stereoscopic images from said collection of images may also be the following process, wherein said holographic-stereogram and stereoscopic image pair covers said holo-stereo lens Projection plane—POV (point of view).

The image captured by each mini-lens/slit is processed separately. Distorted information will be removed from each image of each lens separately. The images are then cropped into pre-defined sections which are required for keeping an adequate overlap between adjacent images.

For stereogram and stereoscopic display, a stereoscopic image pair is created from the group of selected images in the following non limiting examples:

Each of the selected lens images is divided into a left part and a right part using a line passing through the center of the image.

All the left parts generated are merged into one uniform two dimensional image for the right image of the stereoscopic pair to be displayed to the viewer's right eye.

Following the same line, a left image is formed by merging together the right parts generated from the images.

A stereoscopic image pair can also be created from the group of selected images in the following non limiting example:

Each of the slits/mini-lens being on the left side of two adjusted images is divided into a left lens.

Each of the slits/mini-lens being on the right side of two adjusted images is divided into a right lens.

All the left lenses are merged into a one uniform two dimensional image for the left image of the stereoscopic pair to be displayed to the viewer's left eye.

Following the same line, a right image is formed by merging together the right lenses.

The new images Left and Right both cover the viewer's field of vision but obviously they are not identical, and are perceived as were taken from two different viewpoints, thus giving the viewer a stereoscopic perception.

Roughly, this new image pair is equivalent to a pair of images taken by two virtual lenses having their optical axes directed forward in the viewer's viewing direction and having horizontal disparity.

The same holds using any of the Holo-Stereogram optical configurations wherein the field of vision of each lens overlaps to a great extent the fields of view of all adjacent lenses and the lenses are optionally equally distributed on the lens's surface.

Using the configuration where multiple mini lenses are distributed on the Holo-Stereogram lens surface, stereoscopic image pairs can also be created when the viewer's horizon is inclined with respect to ground (i.e., when the viewer eyes are not at the same height with respect to ground). For such cases, the selection horizon of the images is done by projecting the viewer's horizon on the collection of the lenses and the stereoscopic pair is generated by following same steps.

Displaying

The data and images may be displayed to a viewer in various formats, such as stills, video.

The images formed can be displayed by any of the dedicated means such as dedicated hologram display device, stereoscopic viewing, virtual reality, and so on. Depth maps can be viewed in a display device suitable for 3D viewing, can be exported to any 3D image or graphic image processing software to be used for editing and interpolation of any kind using the 3D extracted information.

Image Processing Manipulations of the Images

The process of image processing manipulations of the images is comprised of endless possible options for image manipulations in real time based on the 3D information of the images.

The 3D images are a virtual world. Said virtual world is created in a designated area, where every point in the camera's POV is a 3D point in the virtual world. In the said virtual world 2D or 3D real images and computer generated images from different sources may be merged.

The 3D position of every point in this virtual world is known. We can synchronize between virtual world and other photographed images or computer generated images using space and time synchronization, fitting real world images and computer generated images in the virtual world in spatial and temporal terms.

For those skilled in the art, said virtual worlds are referred to as a virtual studio for example, using the 3D information from the virtual world. Manipulations such as separation between a figure and its background, based on the distance of the figure from the camera are possible. Isolating a figure from its surrounding we can interlace the figure in the virtual world created in a computer.

The opposite thing can also be done interlacing CGI figures or photographed images from different sources in the 3D image.

Holographic stereogram and stereoscopic information enables enhancement of the 3D sensation to the viewers interpolating not only on the 3D positioning in the image, but also in the 3D sensation using stereoscopic imagery.

The present invention is not limited with regards to the type of camera(s) used for capturing the images or sequences of images. The camera(s) may be selected from any known in the art digital or analog video/still cameras, and film cameras. If needed, non-digital data may be converted to digital using known in art techniques.

According to some embodiments of the present invention, a holographic stereogram can also be cylindrical or spherical for panoramic or spherical view. This is achieved by producing stereograms with cylinder or spherical projection planes.

Depth Map Reconstruction

The depth map reconstruction process computes the depth map of a projection plane captured by the holographic stereogram capturing device images, from multiple view points, reconstructing the 3D formation of the projection frame as a 4D matrix. The collective field of vision captured by all said images covers the whole projection frame of said array of images, and wherein any point in said projection frame is captured by at least two of said images.

The first part of the algorithm may be considered in the case where input images from the digital sensor are full RGB images. The printing (e.g. encoding) methods on the digital sensor and reading said images (e.g. decoding) as full RGB images were described earlier.

Depth Map Reconstruction Method

The following example will demonstrate a basic depth map reconstruction method. It should be realized to those skilled in the art that the 4D Matrix algorithms are not limited to any such specific method. Traditional depth map reconstruction methods match points and vectors in the spatial domain to determine correspondence between pixels in multiple images in a single static moment in time. Corresponding features are identified, and rays are intersected to find the 3D position of each feature.

Adding the time domain, using multiple frames across time, we match a single pixel from the first image against the second image. Rather than increasing a vector by considering a neighborhood in the spatial Direction, it is possible to increase a vector in the temporal direction. Space-time depth map reconstruction adds a temporal dimension to the neighborhoods used in the matching function. The computation matches based on oriented space-time windows that allow the matching pixels to shift linearly over time. The match scores based on space-time windows are easily incorporated into existing depth map reconstruction algorithms. The matching vector can be constructed from an arbitrary spatiotemporal region around the pixel in question. In the case of rectangular regions, a window of size N×M×T can be chosen, Where N and M are the spatial sizes of the window, and T is the dimension along the time axis. The optimal space-time matching window depends on the speeds with which objects in the scene move. Static scenes—a long temporal window will give optimal results. Scenes with quickly moving objects—a short temporal window is desirable to avoid the distortions when objects move at intermediate speed, it is likely that a space-time matching window with extent in both space and time will be optimal.

A correspondence must exist between the holographic stereogram exposure geometry and the 4D Matrix reconstruction.

The following example is a Pseudo Code for depth map reconstruction:

VARIABLE DEFINITIONS f=is the focal length.
B=is the distance between the cameras.
$X_1$, $X_2$=the location of point P in Image 1 and in Image 2.
Assumptions:
Since the difference between Z1 and Z2 (which are the Z value of point 1 and point 2) depends only on the differences of the X values, we can generate Z which is not absolute, but is relative to one of the points in the image.
Pseudo Code (for Input of 2 Images)
Take some point p find its $x_1$ and $x_2$, as an example, one can use SSD (sum of square difference).
Denote the expression ($x_1-x_2$) for point p: "deltaX[p]"
Z of point p (Zp) will be: f*B/deltaX[p]
take another point p+1, compute "deltaX[p+1]"
Z of p+1 (Z[p+1]) will be: f*B/deltaX[p+1]
K=deltaX[p+1]/deltaX[p]
So   Z[p+1]=f*B/deltaX[p+1]=(f*B)/(K*deltaX[p])=Z[p]/K
Using this scheme Z[p+n] every point p+n (while n=1 . . . ) we can write using Z[p] And some known number K (K can differ)
Then find n=m such that K for his point [p+m] will be the biggest And so Z[p+m] will be the smallest.
Define Z[p+m]=1, and find Z[p] from here.
Then find the values of all Z[p+n] where n=1.
Input of Multiple Images:

$$X1(w)=(fx)/z \text{ and } Xk(w)=f(X-b1k)/z$$

Where K=2, . . . , N
b1k= O1 Ok—in the baseline corresponding to the Kth view point
f—Focal distance
with respect to first (leftmost) image I1
each point W is viewed in the other images with respective disparities $$dk(w)=\{Xk(w)-X1(w) \text{ if } W \text{ is visible in } Ik \text{ \{undefined if } W \text{ is not visible in } Ik \text{ (is occluded))}$$

where K=2, . . . , N
If W is visible in Ik so:

$$dk(w)=-f(b1k)/z$$

the end disparity of W point−d (w) will be $$d(w)=(\Sigma k=2N\, dk(w))\cdot 1/(N-1)$$

The output of such an algorithm is a depth map, located in a 4D matrix, corresponds to the multiple images of the holographic stereogram, along the time axis.

3D Color Reconstruction

The next step will be the 3D color reconstruction. The following exemplary 3D Color reconstruction method may be used in the case where the input multiple images are full RGB each, where each point in the projection plane is viewed from number of viewpoints, a finite number of different views of the scene. The outcome display of the holo-stereography is continuous 3D color information of an object's appearance, approximated by a finite number of two-dimensional images of that object. The 3D color reconstruction is the horizontal approximation of the continuous natural color captured optically in a discrete form. The output images from the 4D matrix are images of natural scenes with natural lighting.

The reconstructed image in the 4D Matrix hold full RGB color for every point in the image from every point of view. Pending on the dedicated output, one way of output would be to leave the color as layers of full color from every exposed point of view, outputting the image from a discrete point of view with its original color. The other way would be to re-interpolate each point into unified color information of multiple view points. This is especially important in digital sensors such as CCD and Bayer filters where the ¾ of the red and blue, and half of the green color in every point in the image are reconstructed from surrounding points and thus re-demosaicing can enhance dramatically the image quality. Known in the art methods exist to interpolate color for every point. In the 4D matrix, re-interpolation will overcome image distortions, enhance image quality and enable higher resolution. A general example is given here. It should be realized to those skilled in the art that the 3D color reconstruction algorithm is not limited to any such specific method.

The camera's horizontal position determines the angle at which the camera's rays strike the plane of the hologram. Viewing the input images in 2D, similar points in the projection frame appear to be located in the image in deferent horizontal positions due to the disparity of the images exposed to the projection frame. So color reconstruction cannot be done on points that are located on the similar (X,Y) 2D coordinates in the different images. Following the process of the 4D matrix, the projection frame is reconstructed in a 3D matrix and similar points are identified in the different images and in the 3D matrix, each point from every image is located in the identical points' location seen from the said images.

Since the point's color in the real world is a color we can define as our absolute color, the one we will strive to reconstruct in the 3D matrix, different angels exposed to the same point will preserve this color with given distortions such as angels, different horizontal positioning in the image, different lighting, optical distortions and so on. But, given the fact that all projections of the same point are a percentage of the absolute color of that point's color in reality, there is no point in preserving each point's color from different angels but rather to interpolate the point's color from the different angels targeting to reconstruct as best as can be the original absolute color of each point.

furthermore, demosaicing based on 3D location of points in space, interpolate color of points based on surrounding points in the same depth, prevents many distortions that interpolation in 2D images suffer from, for example we interpolate the edge of a wooden table pixel with the pixels of the wall behind him, as opposed to interpolate the wood only with points that surround him in 3D, giving higher image quality to every point in the image and enhancing resolution.

A demosaicing algorithm is used to interpolate a set of RGB color for every point in the image also enabling enhancement of resolution (adding more interpolation points then in the original images), using the point's color as projected from the different viewing angles, and the neighbors 3D surrounding each point, reconstructing a final image which contains full color information (RGB) at each pixel. This process may be done using existing methods to obtain better interpolation.

The demosaicing algorithm works as a RAW format in the sense that it contains pixel information far greater then the final outcome, targeted to reconstruct the absolute color on the one hand while preserving the color characteristics from every angle on the other, in exporting the data or reconstructing new view points that where not exposed originally.

The computer generated 4D matrix of the holographic stereogram is the reconstructed outcome of the non coherent light digital holography apparatus (i.e. this invention). Computer generated holography (CGH) may also be digitally printed using known in the art computer generated Fresnel and/or Kirchhoff and/or Frauenhoffer diffraction by simulating computer generated coherent light.

In this invention, the process of capturing, optically encoding the complex multidimensional data set, decoding and reconstruction of the 4D matrix process under non coherent illumination and digital computing, may be the equal process of coherent light digital holography and/or stereographic hologram process.

According to another embodiment of the present invention, The optical encoding process that creates the complex multidimensional data set equals the complex phase and amplitude digital printing and reconstruction under coherent light. In this embodiment, convolved diffracted light (from the object) propagates through a particular optical system, thus succeeds in recording the complex amplitude of some wave front without beam interference. The claim is that complex amplitude can be restored under non coherent conditions. Once this complex function is in computer memory, one can encode it to a CGH (computer-generated hologram).

This CGH may then be illuminated by a plane wave, which then propagates through the proper optical system. The reconstructed image has features similar to those of an image coming from a coherently recorded hologram.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus for acquiring image data sets of a given scene via two or more optical paths, said apparatus comprising:
a single image sensor array including an array of light sensing elements; and
at least first and second optical paths configured to interleavingly direct light from the given scene, received via different optical paths, onto said single image sensor array concurrently, such that image information from said first optical path and said second optical path is concurrently directed onto interleaving light sensing elements of said array of light sensing elements of said single image sensor array, such that: (1) each given light sensing element of at least a majority of said light sensing elements sensing image information received via said first optical path is situated such that one or more of said light sensing elements sensing image information received via said second optical path are situated to each of four sides of the given light sensing element; and (2) each individual light sensing element of at least a majority of said light sensing elements sensing image information received via said second optical path is situated such that one or more of said light sensing elements sensing image information received via said first optical path are situated to each of four sides of the individual light sensing element.

2. The apparatus according to claim 1, further comprising an image extrapolation block for deriving, from the image information received from said at least first and second optical paths, image data sets representing the given scene from single optical paths.

3. The apparatus according to claim 2, wherein the single optical paths include optical paths other than said at least first and second optical paths directing light from the given scene.

4. The apparatus according to claim 1, wherein each of said at least first and second optical paths comprises a distinct optical element.

5. The apparatus according to claim 4, wherein said distinct element is a distinct filter.

6. The apparatus according to claim 4, wherein said distinct element is a distinct grid.

7. A method for acquiring image data sets of a given scene, said method comprising:
   interleavingly directing light, via first and second optical paths, concurrently, from the given scene, onto a single image sensor array including an array of light sensing elements such that image information from said first optical path and said second optical path; is concurrently directed onto interleaving light sensing elements of said array of light sensing elements of said single image sensor array, such that: (1) each given light sensing element of at least a majority of said light sensing elements sensing image information received via said first optical path is situated such that one or more of said light sensing elements sensing image information received via said second optical path are situated to each of four sides of the given light sensing element; and (2) each individual light sensing element of at least a majority of said light sensing elements sensing image information received via said second optical path is situated such that one or more of said light sensing elements sensing image information received via said first optical path are situated to each of four sides of the individual light sensing element.

8. The method according to claim 7, further comprising using processing circuitry to derive, from the image information received via said first and second optical paths, image data sets representing the given scene from single optical paths.

9. The method according to claim 8, wherein the single optical paths include optical paths other than said first and second optical paths.

* * * * *